US012649820B2

(12) United States Patent
Liu et al.

(10) Patent No.: US 12,649,820 B2
(45) Date of Patent: Jun. 9, 2026

(54) HIGH SELECTIVITY AND HIGH CO2 PLASTICIZATION RESISTANT POLYMERIC MEMBRANES FOR GAS SEPARATIONS

(71) Applicant: UOP LLC, Des Plaines, IL (US)

(72) Inventors: Chunqing Liu, Arlington Heights, IL (US); Chaoyi Ba, Schaumburg, IL (US); Nicole Karns, Des Plaines, IL (US)

(73) Assignee: UOP LLC, Des Plaines, IL (US)

( * ) Notice: Subject to any disclaimer, the term of this patent is extended or adjusted under 35 U.S.C. 154(b) by 806 days.

(21) Appl. No.: 17/819,959

(22) Filed: Aug. 16, 2022

(65) Prior Publication Data

US 2023/0128376 A1 Apr. 27, 2023

Related U.S. Application Data

(60) Provisional application No. 63/262,906, filed on Oct. 22, 2021.

(51) Int. Cl.

| | |
|---|---|
| ***C08G 61/12*** | (2006.01) |
| ***B01D 53/22*** | (2006.01) |
| ***B01D 71/62*** | (2006.01) |
| ***C01B 3/503*** | (2026.01) |
| ***C08G 61/02*** | (2006.01) |
| ***C10L 3/10*** | (2006.01) |

(52) U.S. Cl.

CPC ......... *C08G 61/124* (2013.01); *B01D 53/228* (2013.01); *B01D 71/62* (2013.01); *C01B 3/503* (2013.01); *C08G 61/02* (2013.01); *C10L 3/103* (2013.01); *C10L 3/104* (2013.01); *C01B 2203/0405* (2013.01); *C01B 2203/048* (2013.01); *C08G 2261/122* (2013.01); *C08G 2261/312* (2013.01); *C08G 2261/3241* (2013.01); *C08G 2261/40* (2013.01); *C10L 2290/548* (2013.01)

(58) Field of Classification Search

None

See application file for complete search history.

(56) References Cited

U.S. PATENT DOCUMENTS

| | | | |
|---|---|---|---|
| 4,931,182 | A | 6/1990 | Burgoyne, Jr. et al. |
| 7,485,173 | B1 | 2/2009 | Liu et al. |
| 9,580,824 | B2 | 2/2017 | Masel et al. |
| 10,370,483 | B2 | 8/2019 | Kim et al. |
| 10,435,504 | B2 | 10/2019 | Bae et al. |
| 2005/0268783 | A1 | 12/2005 | Koros et al. |
| 2009/0178561 | A1 | 7/2009 | Miller et al. |
| 2009/0182097 | A1 | 7/2009 | Miller et al. |
| 2020/0308341 | A1 | 10/2020 | Yan et al. |
| 2021/0009726 | A1 | 1/2021 | Yan et al. |

FOREIGN PATENT DOCUMENTS

| | | | |
|---|---|---|---|
| CN | 104425829 | A | 3/2015 |
| CN | 104829814 | A | 8/2015 |
| CN | 109320692 | A | 2/2019 |
| CN | 109384908 | A | 2/2019 |
| CN | 110862516 | A | 3/2020 |
| CN | 110903449 | A | 3/2020 |
| CN | 111303360 | A | 6/2020 |
| CN | 112175170 | A | 1/2021 |
| CN | 112175217 | A | 1/2021 |
| CN | 113583279 | A | 11/2021 |
| CN | 113956445 | A | 1/2022 |
| JP | 2016218140 | A | 12/2016 |
| KR | 101546651 | B1 | 8/2015 |
| KR | 20210071810 | A | 6/2021 |
| WO | 2017190234 | A1 | 11/2017 |
| WO | 2019068051 | A2 | 4/2019 |
| WO | 2019076860 | A1 | 4/2019 |
| WO | 2021172706 | A1 | 9/2021 |

OTHER PUBLICATIONS

Hernandez; Novel Metal-Free Superacid Catalyzed "Click" Reactions of Isatins with Linear Nonactivated Multiring Hydrocarbons; Macromolecules 2010, 43 pp. 6968-6979. (Year: 2010).*

Chen, Chien-Chiang et al., Plasticization-resistant hollow fiber membranes for CO2/CH4 separation based on a thermally crosslinkable polyimide, Journal of Membrane Science 382 (2011) 212-221.

Liu, Ye et al., Chemical cross-linking modification of polyimide membranes for gas separation, Journal of Membrane Science 189 (2001) 231-239.

International Search Report from corresponding PCT application No. PCT/US2022/078205 mailed Feb. 10, 2023.

Written Opinion from corresponding PCT application No. PCT/US2022/078205 mailed Feb. 10, 2023.

Ryu, T. et al., Synthesis and characterization of block copolymer and comparative study with random copolymer via superacid-catalyzed reaction, International journal of hydrogen energy, 2018, vol. 43, pp. 11862-11871.

Lee, S. et al., Synthesis and properties of sulfonated poly(N-methylisatin-biphenylene) proton exchange membrane by superacid-catalyzed polymerization, International journal of hydrogen energy, 2015, vol. 40, pp. 5390-5395.

International Search Report from PCT application No. PCT/IB2022/078207, mailed Feb. 1, 2023.

Written Opinion from PCT application No. PCT/US2022/078207 mailed Jan. 31, 2023.

International Search Report from PCT application No. PCT/IB2023/021186, mailed Aug. 28, 2023.

(Continued)

*Primary Examiner* — David J Buttner

(57) ABSTRACT

A high selectivity and high $CO_2$ plasticization resistant polymer comprises a plurality of repeating units of formula (I) for gas separation applications. The polymer may be synthesized from a superacid catalyzed poly(hydroalkylation) reaction.

$$-\left(Ar_1-X_1\right)_n\left(Ar_2-X_1\right)_m- \qquad (I)$$

Membranes made from the polymer and gas separation processes using the membranes made from the polymer are also described.

14 Claims, 3 Drawing Sheets

(56) References Cited

OTHER PUBLICATIONS

Written Opinion from PCT application No. PCT/IB2023/021186, mailed Aug. 28, 2023.
Wang, Junhua et al., Poly(arly piperidinium) membranes and ionomers for hydroxide exchange membrane fuel cells, Nature Energy, https://doi.org/10.1038/s41560-019-0372-8.
Ba, Chaoyi, et al., U.S. Appl. No. 17/474,198 filed, Sep. 14, 2021, entitled Anion Exchange Polymers and Membranes for Electroylsis.
Liu, Chunqing et al., U.S. Appl. No. 17/388,962, filed Jul. 29, 2021, entitled Electrolyte Compositions for Redox Flow Batteries.
Liu, Chunqing et al., U.S. Appl. No. 17/388,950, filed Jul. 29, 2021, entitled Ionically Conductive Asymmetric Composite Membranes for Electrochemical Energy Storage Applications.
Liu, Chunqing et al., U.S. Appl. No. 17/388,956, filed Jul. 29, 2021, entitled Sandwich-Structured Thin Film Composite Anion Exchange Membrane for Redox Battery Applications.
Liu, Chunqing et al., U.S. Appl. No. 17/389,032, filed Jul. 29, 2021, entitled Ionically Conductive Thin Film Composite Membranes for Energy Storage Applications.
International Search Report from PCT application No. PCT/US2023/073078, mailed Dec. 18, 2023.
Written Opinion from PCT application No. PCT/US2023/073078, mailed Dec. 18, 2023.
International Search Report from PCT application No. PCT/US2023/082688, mailed Apr. 12, 2024.
Written Opinion from PCT application No. PCT/US2023/082688, mailed Apr. 12, 2024.
International Preliminary Report on Patentability from PCT application No. PCT/US2022/076294, issued Mar. 5, 2024.
M. Carmen et al., Novel, Metal-Free, Superacid-Catalyzed "Click" Reactions of Isatins with Linear, Nonactivated, Multiring Aromatic Hydrocarbons, Macromolecules, 2010, 43, 6968-6979.
Extended European Search Report from corresponding European application No. 22884614.3 dated Jul. 17, 2025.
Lillain I. Olvera et al., High thermomechanical stability and ion-conductivity of anion exchange membranes based on quaternized modified poly(oxyndoleterphenylene), Polymer Testing 95, 2021, 107092.
Extended European Search report from European application No. 22884615.0, dated Jul. 10, 2025.
Zhiyang Zhu et al., One-step synthesis of hdroxyl-functionalized fully carbon main chain PIMs via a Friedel-Crafts reaction for efficient gas separation, Separation and Purification Technology, 262, 2021, 118313.

* cited by examiner

Poly(TP-DHB-1-1-isatin)

Poly(TP-DHB-1-3-isatin-TFAP-4-1)

HIGH SELECTIVITY AND HIGH CO2 PLASTICIZATION RESISTANT POLYMERIC MEMBRANES FOR GAS SEPARATIONS

RELATED APPLICATIONS

This application claims priority to U.S. Provisional Patent Application Ser. No. 63/262,906, filed on Oct. 22, 2021, the entirety of which is incorporated herein by reference.

BACKGROUND

In the past 40-45 years, the state of the art of polymer membrane-based gas separation processes has evolved rapidly. Membrane-based technologies have the advantage of low capital cost and high-energy efficiency compared to conventional separation methods. Membrane gas separation is of special interest to petroleum producers and refiners, chemical companies, and industrial gas suppliers. Several applications of membrane gas separation have achieved commercial success, including N2 enrichment from air, carbon dioxide removal from natural gas and from enhanced oil recovery, and in hydrogen removal from nitrogen, methane, and argon in ammonia purge gas streams. For example, UOP's Separex™ spiral wound polymeric membrane technology is currently an international market leader for carbon dioxide removal from natural gas.

Polymers provide a range of properties that are important for gas separation including low cost, permeability, mechanical stability, and ease of processability. Glassy polymers (i.e., polymers at temperatures below their Tg) have stiffer polymer backbones and therefore allow smaller molecules, such as hydrogen and helium, to pass through more quickly, while larger molecules, such as hydrocarbons, pass through more slowly compared to polymers with less stiff backbones. Cellulose acetate (CA) glassy polymer membranes are used extensively in gas separation. Currently, such CA membranes are used for natural gas upgrading, including the removal of carbon dioxide. Although CA membranes have many advantages, they are limited in a number of properties including selectivity, permeability, and in chemical, thermal, and mechanical stability. High performance polymers such as polyimides (PIs) have been developed to improve membrane selectivity, permeability, and thermal stability. These polymeric membrane materials have shown promising intrinsic properties for separation of gas pairs such as $CO_2/CH_4$, $O_2/N_2$, $H_2/CH_4$, $He/CH_4$, and propylene/propane ($C_3H_6/C_3H_8$).

The membranes most commonly used in commercial gas and liquid separation applications are asymmetric polymeric membranes and have a thin nonporous selective skin layer that performs the separation. Separation is based on a solution-diffusion mechanism. This mechanism involves molecular-scale interactions of the permeating gas with the membrane polymer. The mechanism assumes that in a membrane having two opposing surfaces, each component is sorbed by the membrane at one surface, transported by a gas concentration gradient, and desorbed at the opposing surface. According to this solution-diffusion model, the membrane performance in separating a given pair of gases (e.g., $CO_2/CH_4$, $O_2/N_2$, $H_2/CH_4$) is determined by two parameters: the permeability coefficient (abbreviated hereinafter as permeability or $P_A$) and the selectivity ($\alpha_{A/B}$). The $P_A$ is the product of the gas flux and the selective skin layer thickness of the membrane, divided by the pressure difference across the membrane. The $\alpha_{A/B}$ is the ratio of the permeability coefficients of two gases ($\alpha_{A/B}=P_A/P_B$) where $P_A$ is the permeability of the more permeable gas and $P_B$ is the permeability of the less permeable gas. Gases can have high permeability coefficients because of a high solubility coefficient, a high diffusion coefficient, or because both coefficients are high. In general, the diffusion coefficient decreases while the solubility coefficient increases with an increase in the molecular size of the gas. In high performance polymer membranes, both high permeability and selectivity are desirable because higher permeability decreases the size of the membrane area required to treat a given volume of gas, thereby decreasing capital cost of membrane units, and because higher selectivity results in a higher purity product gas.

One of the components to be separated by a membrane must have a sufficiently high permeance at the preferred conditions or extraordinarily large membrane surface areas is required to allow separation of large amounts of material. Permeance, measured in Gas Permeation Units (GPU, 1 GPU=$10^{-6}$ $cm^3$ (STP)/$cm^2$ s (cm Hg)), is the pressure normalized flux and equals to permeability divided by the skin layer thickness of the membrane. Commercially available gas separation polymer membranes, such as CA and polysulfone membranes formed by phase inversion and solvent exchange methods have an asymmetric integrally skinned membrane structure. Such membranes are characterized by a thin, dense, selectively semipermeable surface "skin" and a less dense void-containing (or porous), non-selective support region, with pore sizes ranging from large in the support region to very small proximate to the "skin". However, fabrication of defect-free high selectivity asymmetric integrally skinned polyimide membranes is difficult. The presence of nanopores or defects in the skin layer reduces the membrane selectivity. The high shrinkage of the polyimide membrane on a cloth substrate during the membrane casting and drying process may result in unsuccessful fabrication of asymmetric integrally skinned polyimide membranes using phase inversion technique.

In order to combine high selectivity and high permeability together with high thermal stability, new high-performance polymers such as polyimides (PIs), poly(trimethylsilylpropyne) (PTMSP), and polytriazole were developed. These new polymeric membrane materials have shown promising properties for separation of gas pairs like $CO_2/CH_4$, $O_2/N_2$, $H_2/CH_4$, and $C_3H_6/C_3H_8$. However, gas separation processes based on glassy polymer membranes frequently suffer from plasticization of the stiff polymer matrix by sorbed penetrating molecules such as $CO_2$ or $C_3H_6$. Plasticization of the polymer is exhibited by swelling of the membrane structure and by a significant increase in the permeances of all components in the feed and a decrease of selectivity occurring above the plasticization pressure when the feed gas mixture contains condensable gases. Plasticization is particularly an issue for gas fields containing high $CO_2$ concentrations and heavy hydrocarbons and for systems requiring two-stage membrane separation.

US 2005/0268783 A1, US 2009/0182097 A1, and US 2009/0178561 A1 disclosed chemically cross-linked polyimide hollow fiber membranes prepared in a two-step process. Step one is the synthesis of a monoesterified polyimide polymer in a solution by treating a polyimide polymer containing a carboxylic acid functional group with a small diol molecule at esterification conditions in the presence of dehydrating conditions. However, a significant extra amount of diol was used to prevent the formation of biesterified polyimide polymer. Step two is the solid state transesterification of the monoesterified polyimide membrane at elevated temperature to form a cross-linked polyimide membrane.

Chemical cross-linking of polyimides using diamine small molecules has also been disclosed (Chemical cross-linking modification of polyimide membranes for gas separation, J. MEMBR. SCI., 2001, 189, 231-239). However, the $CO_2$ permeability decreased significantly after this type of cross-linking. In addition, the thermal stability and hydrolytic stability of the diamine cross-linked polyimide were not improved.

Koros et al. disclosed a decarboxylation-induced thermally cross-linked polyimide membrane. (Plasticization-resistant hollow fiber membranes for $CO_2/CH_4$ separation based on a thermally crosslinkable polyimide, J. MEMBR. SQ., 2011, 382, 212-221) However, the decarboxylation reaction among the carboxylic acid groups on the carboxylic acid group-containing polyimide membrane occurred at temperatures higher than the glass transition temperature of the polyimide polymer. The high temperature resulted in densification of the substructure of the membrane and decreased membrane permeance.

U.S. Pat. No. 7,485,173 disclosed mixed matrix membranes cross-linked using ultraviolet (UV) radiation. The cross-linked mixed matrix membranes comprise microporous materials dispersed in the continuous UV cross-linked polymer matrix.

U.S. Pat. Nos. 4,931,182 and 7,485,173 disclosed polyimide membranes physically cross-linked using UV radiation. The cross-linked membranes showed improved selectivities for gas separations. However, controlling the cross-linking degree of the thin selective layer of the asymmetric gas separation membranes is difficult using UV radiation, which will result in very low permeances, although the selectivities are normally very high.

Therefore, there remains a need for high performance and high stability polymeric materials and membranes for the development of gas separation membrane technologies.

DESCRIPTION OF THE INVENTION

Figure 1:
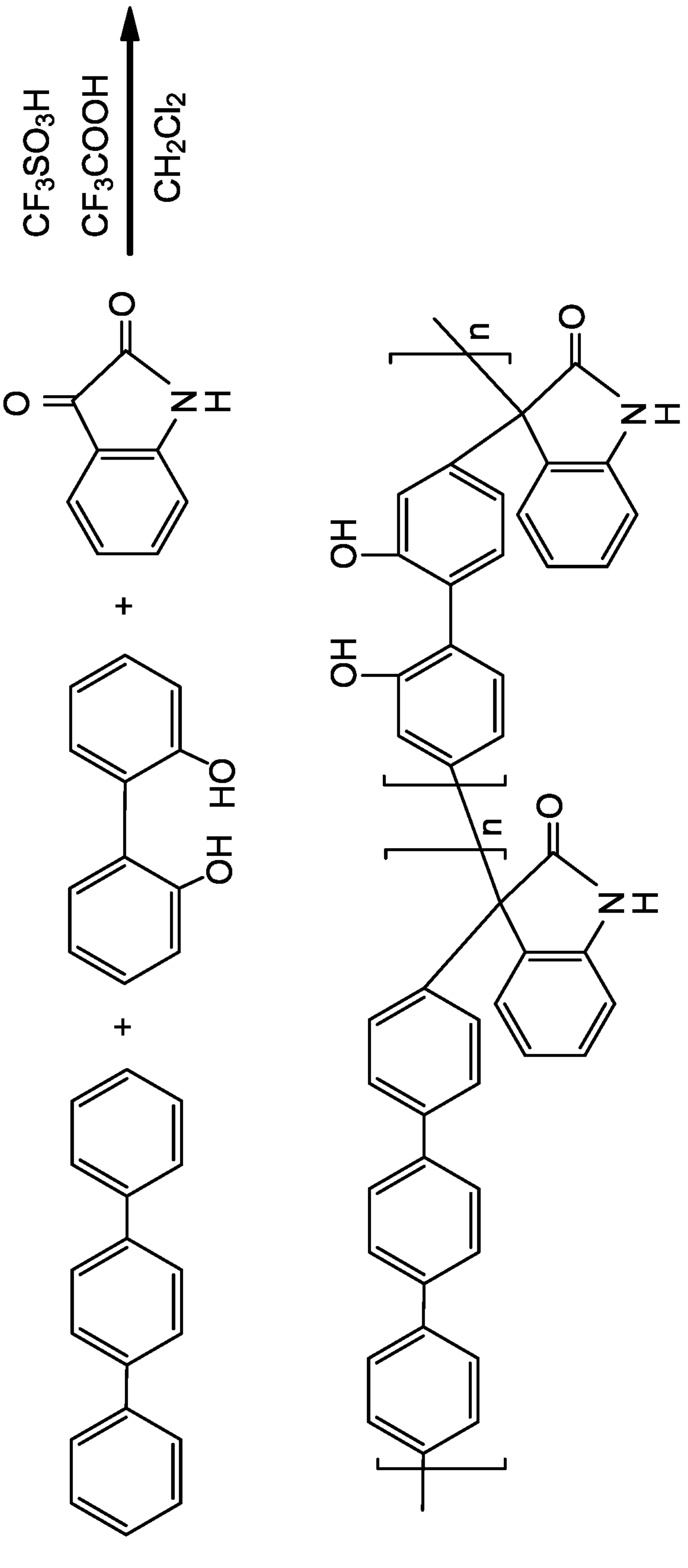
FIG. 1 is an illustration of one embodiment of the synthesis of poly(TP-DHB-1-1-isatin) polymer.

The use of membranes for separation of both gases and liquids is a growing technological area with potentially high economic reward due to the low energy requirements and the potential for scaling up of modular membrane designs. Advances in membrane technology, with the continuing development of new membrane materials and new methods for the production of high-performance membranes will make this technology even more competitive with traditional, high-energy intensive and costly processes such as distillation. Among the applications for commercial gas separation membrane systems are nitrogen enrichment, oxygen enrichment, hydrogen recovery, removal of hydrogen sulfide and carbon dioxide from natural gas, biogas purification to remove acid gases, and dehydration of air and natural gas. Also, various hydrocarbon separations are potential applications for the appropriate membrane system. The membranes that are used in these applications must have high selectivity, durability, and productivity in order to be economically successful. Several applications of membrane gas separation have achieved commercial success, including nitrogen enrichment from air, carbon dioxide removal from natural gas and biogas, and in enhanced oil recovery. The United States produces more than 70 million tons of organic waste each year. Organic wastes generate large amounts of methane as they decompose. Methane is a powerful greenhouse gas and will absorb 86 times more heat in 20 years than $CO_2$. To reduce greenhouse gas emissions and the risk of pollution to waterways, organic waste can be removed and used to produce biogas, a renewable source of energy. The United States currently has about 2,200 operating biogas systems, representing less than 20 percent of the total potential. The biogas feedstocks include food waste, landfill gas, livestock waste, wastewater treatment, and crop residues, and normally contain about 30-40% $CO_2$. $CO_2$ capture from flue gas is expected to have an important role in reducing greenhouse gas emissions and mitigating global climate change. Membrane technology can be used alone or together with other gas treating technologies for the removal of $CO_2$ and $H_2S$ from pre-treated biogas to produce purified renewable natural gas and for the capture of $CO_2$ from flue gas.

The present invention discloses a new type of high selectivity and high $CO_2$ plasticization resistant polymers and membranes for gas separations, such as for $H_2$ recovery, helium recovery, biogas purification, $CO_2$ removal from natural gas, and air separation, and methods for making and using these membranes. In addition, this type of polyme with phenolic hydroxyl groups has high potential for the development of functional membranes for other applications such as energy storage, electrolysis, and fuel cell applications.

The high selectivity and high $CO_2$ plasticization resistant polymers have hydrophobic polymer backbones that provide the polymer high chemical stability, isatin-based moieties that increase the rigidity and free volume of the polymer, and hydrophilic phenolic hydroxyl groups that can form H-bonding on the polymer side chains. Therefore, membranes prepared from these polymers have high chemical and thermal stability, high mechanical stability, high gas permeability, high selectivity, and high $CO_2$ plasticization resistance for gas separations.

This high selectivity and high $CO_2$ plasticization resistant polymer comprises a plurality of repeating units of formula (I), such as poly(aryl-biphenol-isatin) polymer, for gas separation applications. The polymer comprising a plurality of repeating units of formula (I) was synthesized from a superacid catalyzed poly(hydroalkylation) reaction.

$$-\!\left(Ar_1-X_1\right)_n\!\left(Ar_2-X_1\right)_m\!- \qquad (I)$$

wherein $Ar_1$ is selected from the group consisting of:

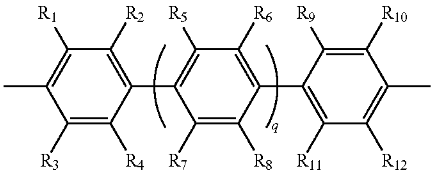

,

-continued
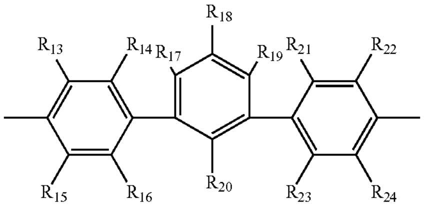
,
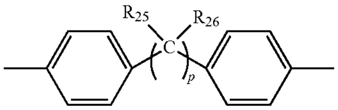
,
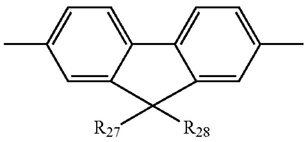
,
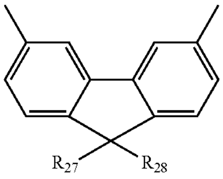
,
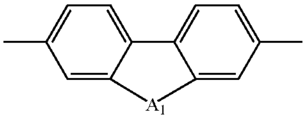
,
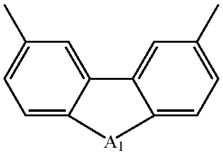
,
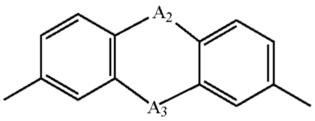
and mixtures thereof;
wherein $Ar_2$ is selected from the group consisting of:
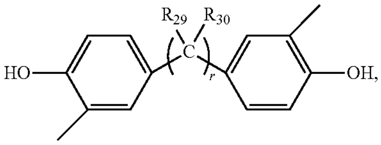
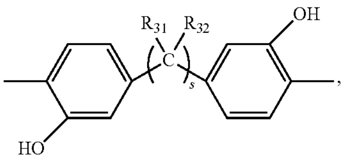
,
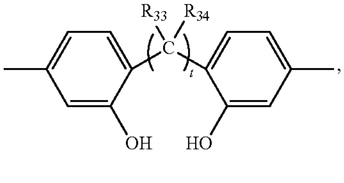
,
-continued
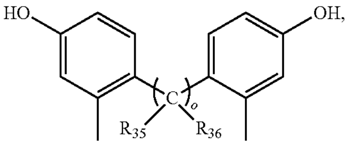
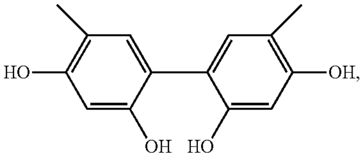
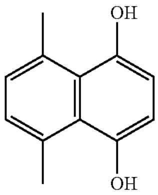
,
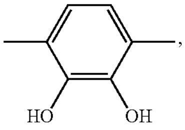
,
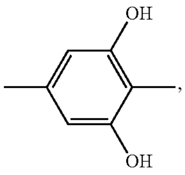
,
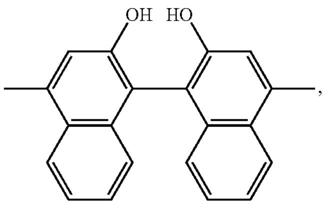
,
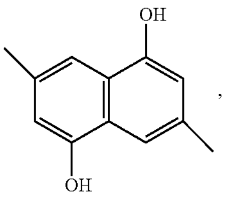
,
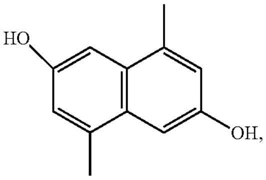
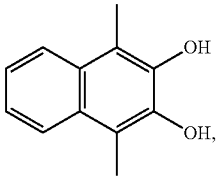
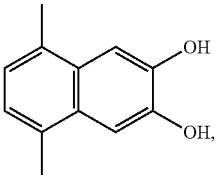
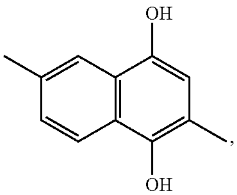
,
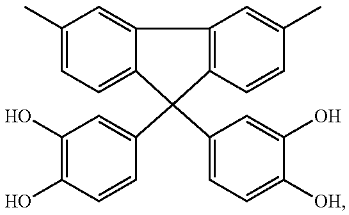
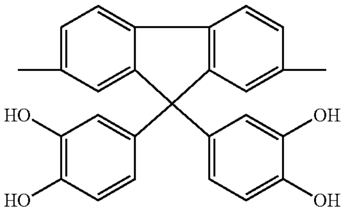

and mixtures thereof;

wherein $X_1$ is selected from the group consisting of:

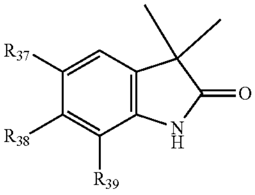

or a mixture of

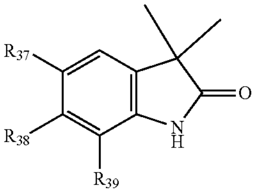

and one or more of:

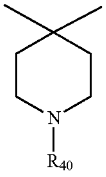

and

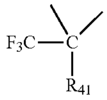

$R_1$-$R_{36}$ are each independently hydrogen, a halogen, an alkyl group, an alkenyl group, an alkynyl group, or an aryl group. The alkyl group, the alkenyl group, the alkynyl group, or the aryl group may optionally be substituted with a halogen.

$R_{37}$-$R_{40}$ are each independently hydrogen, an alkyl group, an alkenyl group, an alkynyl group, or an aryl group. The alkyl group, the alkenyl group, the alkynyl group or the aryl group may optionally be substituted with a halogen.

$R_{41}$ is an alkyl group, an alkenyl group, an alkynyl group, or an aryl group. The alkyl group, the alkenyl group, the alkynyl group, or the aryl group may optionally be substituted with a halogen.

The halogen is F, Cl, Br, or I; $A_1$, $A_2$, and $A_3$ are each independently O, S, or NH; m is an integer from 5 to 5000; n is an integer from 0 to 5000; A molar ratio of n/m is in a range of 0:1 to 20:1; p is 1, 2, 3, or 4; q is 0, 1, 2, or 3; and r, s, t, and o are independently 0, 1, 2, or 3.

In some embodiments, $Ar_1$ is selected from the group consisting of:

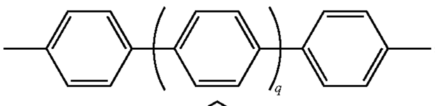

,

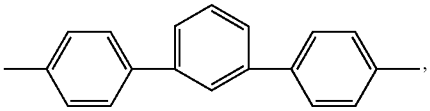

,

-continued

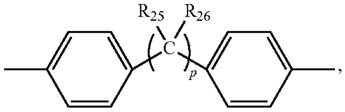

,

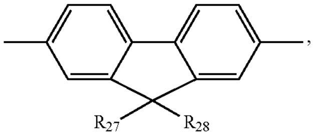

,

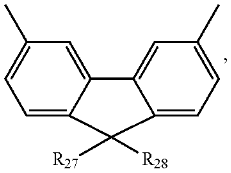

,

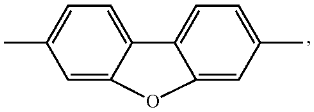

,

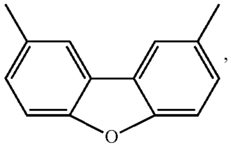

,

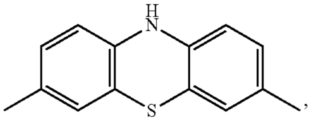

,

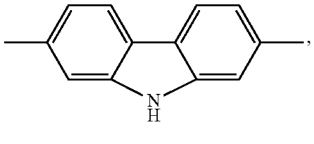

,

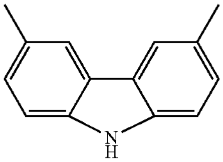

and mixtures thereof, wherein $R_{25}$, $R_{26}$, $R_{27}$, and $R_{28}$ are each independently —H or —$CH_3$;

wherein p is 1 or 2; and wherein q is 0 or 1.

In some embodiments, Are is selected from the group consisting of:

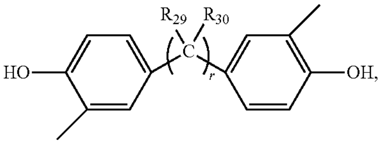

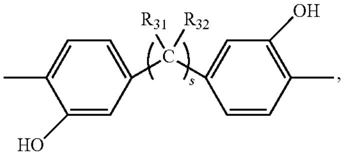

,

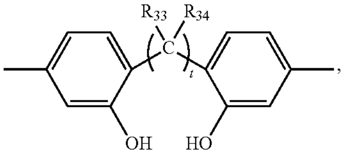

,

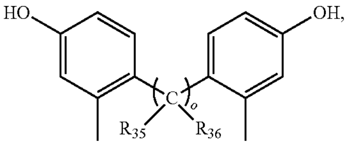

-continued

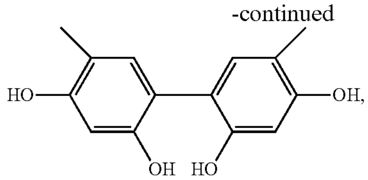

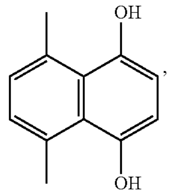,

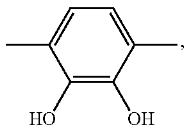,

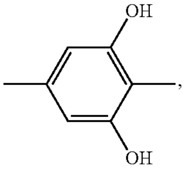,

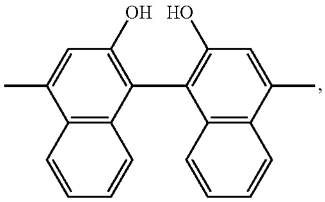,

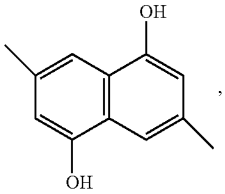,

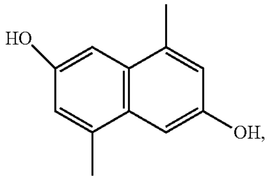

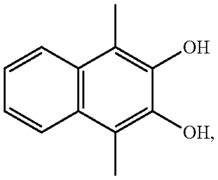

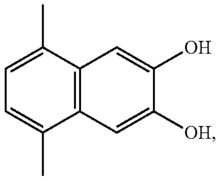

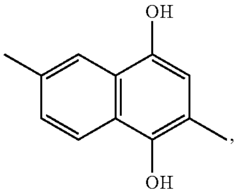,

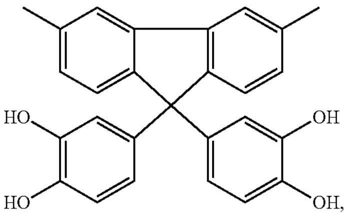

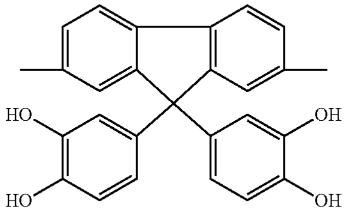

and mixtures thereof;

wherein $R_{29}$, $R_{30}$, $R_{31}$, $R_{32}$, $R_{33}$, $R_{34}$, $R_{35}$, and $R_{36}$ are each independently $-CH_3$ or $-CF_3$; and wherein r, s, t, and o are each independently 0 or 1.

In some embodiments, $X_1$ is

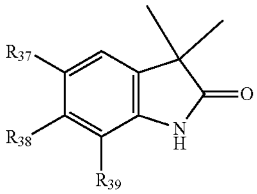

wherein $R_{37}$, $R_{38}$, and $R_{39}$ are each independently $-H$, $-CH_3$, $-CH_2CH_3$, $-CH(CH_3)_2$, $-C(CH_3)_3$, $-CH_2-C_6H_5$, or $-CH_2-CH(CH_3)_2$.

In some embodiments, $X_1$ is a mixture of

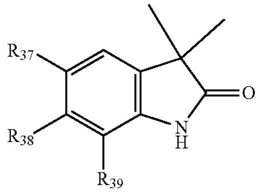 and 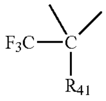

wherein $R_{37}$, $R_{38}$, and $R_{39}$ are each independently $-H$, $-CH_3$, $-CH_2CH_3$, $-CH(CH_3)_2$, $-C(CH_3)_3$, $-CH_2-C_6H_5$, or $-CH_2-CH(CH_3)_2$; and wherein $R_{41}$ is $-CH_3$, $-CH_2CH_3$, or $-C_6H_5$.

In some embodiments, $X_1$ is a mixture of

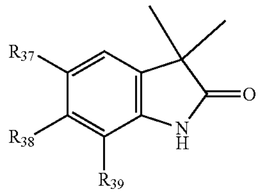 and 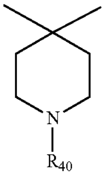

wherein $R_{37}$, $R_{38}$, $R_{39}$, and $R_{40}$ are each independently $-H$, $-CH_3$, $-CH_2CH_3$, $-CH(CH_3)_2$, $-C(CH_3)_3$, $-CH_2-C_6H_5$, or $-CH_2-CH(CH_3)_2$.

In some embodiments, $X_1$ is a mixture of

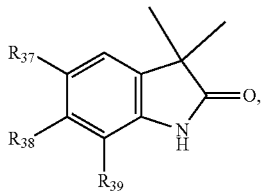

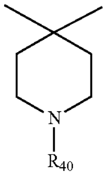, and 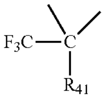

wherein $R_{37}$, $R_{38}$, $R_{39}$, and $R_{40}$ are each independently $-H$, $-CH_3$, $-CH_2CH_3$, $-CH(CH_3)_2$, $-C(CH_3)_3$, $-CH_2-C_6H_5$, or $-CH_2-CH(CH_3)_2$; and wherein $R_{41}$ is $-CH_3$, $-CH_2CH_3$, or $-C_6H_5$.

In some embodiments, the polymer comprising a plurality of repeating units of formula (I) is formed from a superacid catalyzed polyhydroxyalkylation reaction of monomers $Ar_1'$, $Ar_2'$, and $X_1'$.

$Ar_1'$ is selected from the group consisting of:

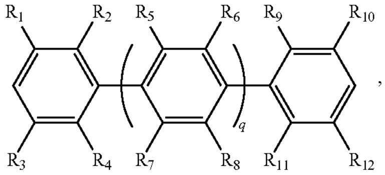
,
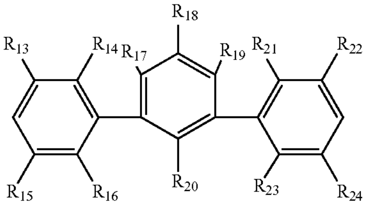
,
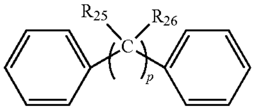
,
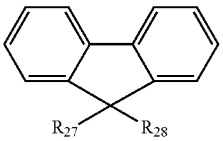
,
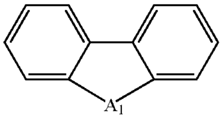
,
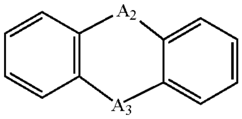

and mixtures thereof.

$Ar_2'$ is selected from the group consisting of:

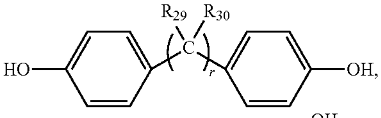
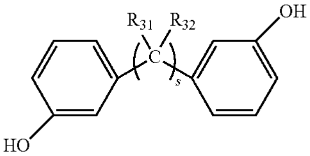
,
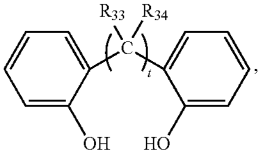
,
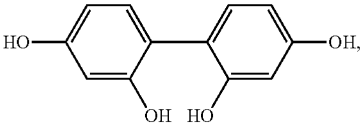
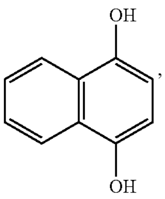
,
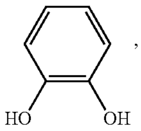
,
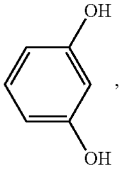
, -continued

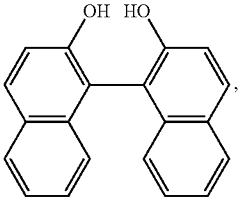
,
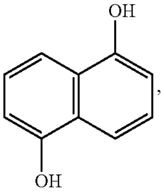
,
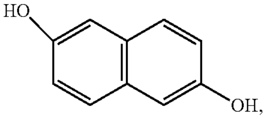
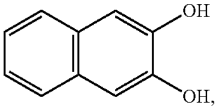
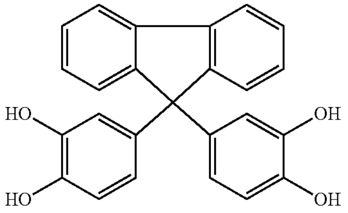 [SMILES: Oc1ccc(C2(c3ccc(O)c(O)c3)c3ccccc3-c3ccccc32)cc1O]

and mixtures thereof.

$X_1'$ is selected from the group consisting of:

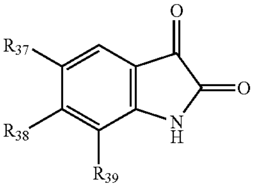

or a mixture of

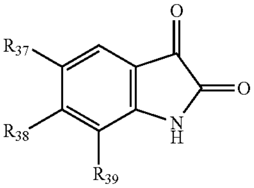

and one or more of

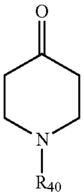

and

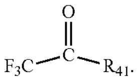

$R_1$-$R_{34}$ are each independently hydrogen, a halogen, an alkyl group, an alkenyl group, an alkynyl group, or an aryl group. The alkyl group, the alkenyl group, the alkynyl group, or the aryl group may optionally be substituted with a halogen.

$R_{37}$-$R_{40}$ are each independently hydrogen, an alkyl group, an alkenyl group, an alkynyl group, or an aryl group. The alkyl group, the alkenyl group, the alkynyl group, or the aryl group may optionally be substituted with a halogen.

$R_{41}$ is an alkyl group, an alkenyl group, an alkynyl group, or an aryl group, and wherein the alkyl group, the alkenyl group, the alkynyl group, or the aryl group is optionally substituted with a halogen.

$A_1$, $A_2$, and $A_3$ are each independently O, S, or NH; p is 1, 2, 3, or 4; q is 0, 1, 2, or 3; and r, s, and t are independently 0, 1, 2, or 3.

In some embodiments, $Ar_1'$ is selected from the group consisting of:

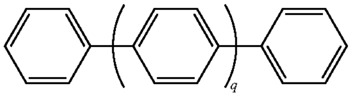
,
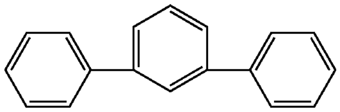
,
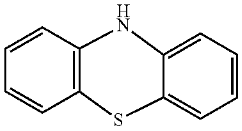
,
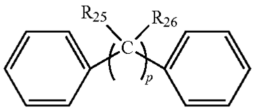
,
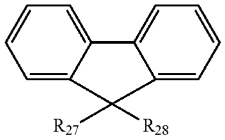
,
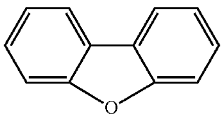
,
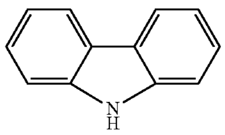

and mixtures thereof, wherein $R_{25}$, $R_{26}$, $R_{27}$, and $R_{28}$ are each independently —H or —$CH_3$;

wherein p is 1 or 2; and wherein q is 0 or 1.

In some embodiments, Are' is selected from the group consisting of:

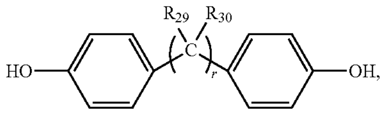

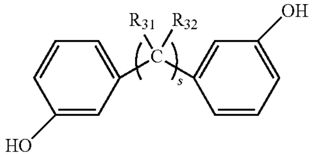
,
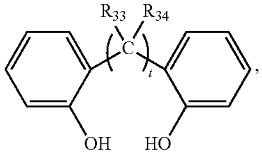

-continued

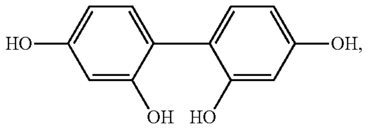
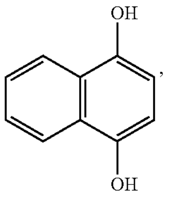
,
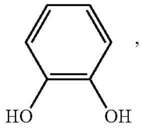
,
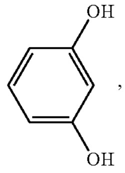
,
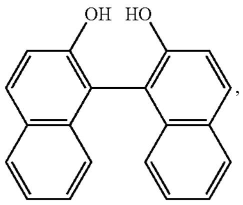
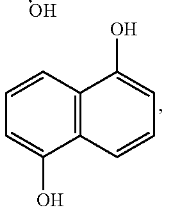
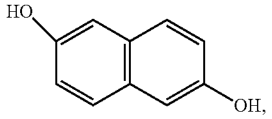
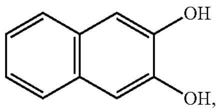
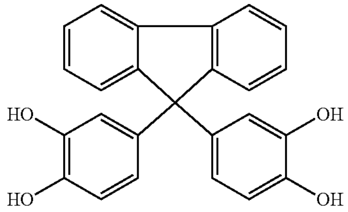 [SMILES: Oc1ccc(C2(c3ccc(O)c(O)c3)c3ccccc3-c3ccccc32)cc1O]

and mixtures thereof;

wherein $R_{29}$, $R_{30}$, $R_{31}$, $R_{32}$, $R_{33}$, and $R_{34}$ are each independently —$CH_3$ or —$CF_3$;

wherein r, s, and t are independent 0 or 1.

In some embodiments, $X_1'$ is

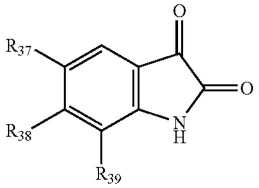

wherein $R_{37}$, $R_{38}$, and $R_{39}$ are each independently —H, —$CH_3$, —$CH_2CH_3$, —$CH(CH_3)_2$, —$C(CH_3)_3$, —$CH_2$—$C_6H_5$, or —$CH_2$—$CH(CH_3)_2$.

In some embodiments, $X_1'$ is a mixture of

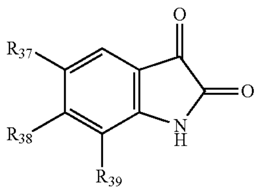

and

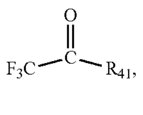

wherein $R_{37}$, $R_{38}$, and $R_{39}$ are each independently —H, —$CH_3$, —$CH_2CH_3$, —$CH(CH_3)_2$, —$C(CH_3)_3$, —$CH_2$—$C_6H_5$, or —$CH_2$—$CH(CH_3)_2$; and wherein $R_{41}$ is —$CH_3$, —$CH_2CH_3$, or —$C_6H_5$.

In some embodiments, $X_1$' is a mixture of

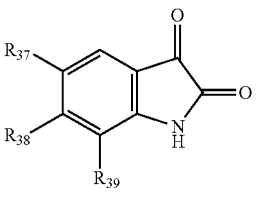

and

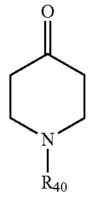

wherein $R_{37}$, $R_{38}$, $R_{39}$, and $R_{40}$ are each independently —H, —$CH_3$, —$CH_2CH_3$, —$CH(CH_3)_2$, —$C(CH_3)_3$, —$CH_2$—$C_6H_5$, or —$CH_2$—$CH(CH_3)_2$.

In some embodiments, $X_1$' is a mixture of

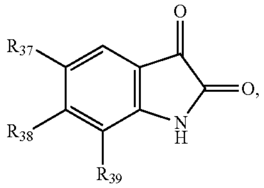

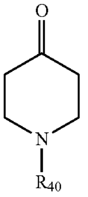

and

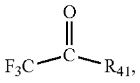

wherein $R_{37}$, $R_{38}$, $R_{39}$, and $R_{40}$ are each independently —H, —$CH_3$, —$CH_2CH_3$, —$CH(CH_3)_2$, —$C(CH_3)_3$, —$CH_2$—$C_6H_5$, or —$CH_2$—$CH(CH_3)_2$;

and wherein $R_{41}$ is —$CH_3$, —$CH_2CH_3$, or —$C_6H_5$.

The high selectivity and high $CO_2$ plasticization resistant polymer comprising a plurality of repeating units of formula (I), such as poly(aryl-biphenol-isatin) polymer, may be synthesized via a superacid catalyzed polyhydroxyalkylation reaction of monomers $Ar_1$' and $Ar_2$' with $X_1$', such as p-terphenyl as $Ar_1$' and 2,2'-dihydroxybiphenyl as $Ar_2$' with isatin as $X_1$'.

The polyhydroxyalkylation reaction of monomers $Ar_1$' and $Ar_2$' with monomer $X_1$' provides a polymer with a polymer backbone free of ether bonds, which results in high chemical stability of the polymer. The incorporation of electron-rich monomer $Ar_1$' into the polymer provides a hydrophobic polymer backbone and the incorporation of monomer $Ar_2$' with phenolic hydroxyl functional groups into the polymer forms H-bonding on the polymer side chains. The incorporation of monomer $X_1$' into the polymer provides the polymer with isatin-based moieties that increase the rigidity and free volume of the polymer, which helps to achieve high gas permeability. Therefore, polymeric membranes prepared from this type of polymer have high chemical and thermal stability, high mechanical stability, high gas permeability, high selectivity, and high $CO_2$ plasticization resistance for gas separations.

In some cases, the monomer $X_1$' is a mixture of an isatin-based monomer and a non-isatin-based monomer to enable the formation of a high molecular weight polymer. The molar ratio of $Ar_1$' monomer to $Ar_2$' monomer for the synthesis of the polymer comprising a plurality of repeating units of formula (I) can be in a range of 0:1 to 20:1, or in a range of 10:1 to 1:10, or in a range of 5:1 to 1:5. The molar ratio of $X_1$' monomer to $Ar_1$' and $Ar_2$' monomers for the synthesis of the polymer comprising a plurality of repeating units of formula (I) can be in a range of 1.2:1 to 1:1.2, or in a range of 1.1:1 to 1:1.1, or in a range of 1.05:1 to 1:1.05.

The superacid catalyzed polyhydroxyalkylation reaction can be carried out at 0° C. to 50° C., or at 10° C. to 30° C., or at 20° C. to 30° C. for 2 h to 72 h, or 10 h to 48 h, or 12 to 24 h. Suitable superacid catalysts include, but are not limited to, trifluoromethanesulfonic acid ($CF_3SO_3H$ (TFSA)), methanesulfonic acid (MSA), fluorosulfuric acid ($FSO_3H$), or mixtures thereof. Solvents for the polyhydroxyalkylation reaction are those that can dissolve one or more of the monomers. Suitable solvents include, but are not limited to, methylene chloride, chloroform, trifluoroacetic acid (TFA), or mixtures thereof.

The high selectivity and high $CO_2$ plasticization resistant polymer has a weight average molecular weight in a range of 10,000 to 1,000,000 Daltons, or in a range of 50,000 to 500,000 Daltons.

Another aspect of the invention is a high selectivity and high $CO_2$ plasticization resistant polymeric membrane comprising the polymer described above. In some embodiments, the high selectivity and high $CO_2$ plasticization resistant polymeric membrane is an integrally-skinned asymmetric membrane or a thin film composite (TFC) membrane.

In some embodiments, the thin film composite membrane comprises a porous substrate membrane coated with the high selectivity and high $CO_2$ plasticization resistant polymer comprising a plurality of repeating units of formula (I). The porous substrate membrane is prepared from a polymer which may be the same as, or different from, the high selectivity and high $CO_2$ plasticization resistant polymer comprising a plurality of repeating units of formula (I).

In some embodiments, the integrally-skinned asymmetric membrane or the TFC membrane may be a flat sheet membrane or a hollow fiber membrane.

In some embodiments, the membrane comprising the high selectivity and high $CO_2$ plasticization resistant polymer comprising a plurality of repeating units of formula (I) is made into spiral wound, hollow fiber, or plate and frame membrane module.

The integrally-skinned asymmetric membrane comprising the high selectivity and high $CO_2$ plasticization resistant polymer comprising a plurality of repeating units of formula (I) has an asymmetric integrally skinned membrane structure comprising a thin selective skin layer on top of a porous support layer formed simultaneously from a one-step phase inversion process from the same membrane material.

In some embodiments, the integrally-skinned asymmetric flat sheet membrane comprising the high selectivity and high $CO_2$ plasticization resistant polymer is prepared using a dry-wet phase inversion technique comprising: 1) making a membrane casting solution comprising the polymer with formula (I), solvents which are miscible with water and can dissolve the polymer with formula (I), and non-solvents which cannot dissolve the polymer with formula (I); 2) casting a layer of the membrane casting solution onto a supporting substrate using a membrane casting machine; 3) evaporating the solvent and non-solvent from the surface of the coated layer on the supporting substrate to form the nascent flat sheet membrane with a thin dense selective skin layer on the surface; 4) coagulating the coated polymer layer in a coagulating bath to form the integrally-skinned asymmetric membrane structure comprising a thin nonporous dense layer on top of a microporous support layer coated on the supporting substrate; 5) drying the membrane at 50° C. to 150° C., or at 50° C. to 120° C., or at 80° C. to 120° C.; and optionally 6) a membrane post-treatment step can be added after step 5) to further improve the selectivity but not change or damage the membrane or cause the membrane to lose performance with time. The membrane post-treatment step can involve coating the selective layer surface of the membrane with a thin layer of material such as a polysiloxane, a fluoropolymer, a thermally curable silicone rubber, or a UV radiation curable silicone rubber. The supporting substrate is highly porous and may comprise a polyolefin such as polypropylene and polyethylene, polyester, polyamide such as Nylon 6 and Nylon 6,6, cellulose, polybenzimidazole, polycarbonate, or fluorocarbon-based polymer such as polytetrafluoroethylene (PTFE) and polyvinylidene fluoride (PVDF). These polymers provide a range of properties, such as low cost, high air permeance, and good chemical, thermal, and mechanical stability. The supporting substrate can be either a non-woven matrix or a woven matrix and have either a symmetric porous structure or an asymmetric porous structure.

The solvents for the preparation of the membrane casting solution may include, but are not limited to, N-methyl-2-pyrrolidone (NMP), dimethylacetamide (DMAc), dimethylformamide (DMF), dimethyl sulfoxide (DMSO), dioxanes, 1,3-dioxolane, and mixtures thereof. The non-solvents for the preparation of the membrane casting solution include, but are not limited to, acetone, methanol, ethanol, tetrahydrofuran (THF), toluene, n-octane, n-decane, lactic acid, citric acid, isopropanol, and mixtures thereof. The integrally-skinned asymmetric flat sheet membrane may have a thin nonporous dense layer less than 100 nm on a microporous support layer.

In some embodiments, the integrally-skinned asymmetric hollow fiber membrane comprising the high selectivity and high $CO_2$ plasticization resistant polymer comprising a plurality of repeating units of formula (I) is prepared using a dry-wet phase inversion technique comprising: 1) making a membrane spinning solution comprising the polymer with formula (I), solvents which are miscible with water and can dissolve the polymer with formula (I), and non-solvents which cannot dissolve the polymer with formula (I); 2) spinning the spinning solution with a bore fluid simultaneously from an annular spinneret using a hollow fiber spinning machine wherein said bore fluid is pumped into the center of the annulus and wherein said spinning solution is pumped into the outer layer of the annulus; 3) passing the nascent hollow fiber membrane through an air gap between the surface of the spinneret and the surface of the nonsolvent coagulation bath to evaporate the solvent and non-solvent for a certain time to form the nascent hollow fiber membrane with a thin dense selective skin layer on the surface; 4) immersing the nascent hollow fiber membrane into the nonsolvent (e.g., water) coagulation bath at a controlled temperature which is in a range of 0° to 50° C. to generate the porous non-selective support layer below the thin dense selective skin layer by phase inversion, followed by winding up the hollow fibers on a drum, roll or other suitable device; 5) solvent exchanging with an alcohol or a hydrocarbon solvent such as hexane or both for certain times at room temperature; 6) annealing the wet hollow fibers in a hot water bath at a certain temperature which is in a range of about 50° to about 100° C. for a certain time which is in a range of about 10 minutes to about 12 hours; and 7) drying the hollow fiber membrane at a certain temperature which is in a range of about 50° to about 150° C. or in a range of about 70° to about 100° C. It is worth noting that the order for the solvent exchanging step 5) and annealing step 6) helps to achieve high membrane performance and prevent fire caused by flammable methanol solvent during the final membrane drying step. Optionally, a membrane post-treatment step can be added after step 7) to further improve the selectivity but not change or damage the membrane or cause the membrane to lose performance with time. The membrane post-treatment step can involve coating the selective layer surface of the hollow fiber membrane with a thin layer of material such as a polysiloxane, a fluoropolymer, a thermally curable silicone rubber, or a UV radiation curable silicone rubber. The hollow fiber membrane made using this approach contains a super thin defect-free dense selective skin layer which is less than 100 nm on a porous non-selective layer and both layers are made from the same membrane material comprising a plurality of repeating units of formula (I).

The solvents for the preparation of the spinning solution for the preparation of the hollow fiber membrane may include, but are not limited to, NMP, DMAc, DMF, DMSO, dioxanes, 1,3-dioxolane, and mixtures thereof. The non-solvents for the preparation of the membrane casting solution include, but are not limited to, acetone, methanol, ethanol, THF, toluene, n-octane, n-decane, lactic acid, citric acid, isopropanol, and mixtures thereof. The integrally-skinned asymmetric hollow fiber membrane may have a thin nonporous dense layer less than 100 nm on a microporous support layer.

In some embodiments, the thin film composite membrane comprising the high selectivity and high $CO_2$ plasticization resistant polymer comprising a plurality of repeating units of formula (I) is prepared using a method comprising: 1) dissolving the polymer comprising a plurality of repeating units of formula (I) in a solvent to form a polymer coating solution; 2) coating a layer of the polymer coating solution on one surface of a microporous support membrane via dip-coating, meniscus coating, spin coating, casting, soaking, spraying, painting, or other known conventional solution coating technologies; 3) drying the coated membrane at 50° C. to 150° C., or at 50° C. to 120° C., or at 80° C. to 120° C.; and optionally 4) a membrane post-treatment step can be added after step 3) to further improve the selectivity but not change or damage the membrane or cause the membrane to lose performance with time. The membrane post-treatment step can involve coating the selective layer surface of the membrane with a thin layer of material such as a polysiloxane, a fluoropolymer, a thermally curable silicone rubber, or a UV radiation curable silicone rubber. The solvents for the preparation of the thin film composite membrane may include, but are not limited to, NMP, DMAc, DMF, DMSO, dioxanes, 1,3-dioxolane, chloroform, dichloromethane, and mixtures thereof. The microporous support membrane should have good thermal stability (stable up to at least 120° C.), high chemical stability in the organic solvents, high mechanical strength (no dimensional change under the system operation conditions), as well as other factors dictated by the operating conditions for gas or liquid separations. The microporous support membrane must be compatible with the polymer coating solution chemistry and meet the mechanical demands of membrane assembly operations.

The polymers suitable for the preparation of the microporous support membrane can be selected from, but not limited to, polyolefins such as polyethylene and polypropylene, polyamide such as Nylon 6 and Nylon 6,6, polyester, cellulose acetate, polybenzimidazole, fluorocarbon-based polymer such as PTFE and PVDF, polycarbonate, cellulose, or combinations thereof. These polymers provide a range of properties such as low cost, high chemical and thermal stability, good mechanical stability, and ease of processability for membrane fabrication.

Another aspect of the invention is the use of the high selectivity and high $CO_2$ plasticization resistant polymeric membrane comprising the high selectivity and high $CO_2$ plasticization resistant polymer comprising a plurality of repeating units of formula (I) for a wide range of gas separations such as for acid gas removal from natural gas or biogas, $H_2$ recovery, He recovery, and air separations.

The invention provides a process for separating at least one gas from a mixture of gases using the new high selectivity and high $CO_2$ plasticization resistant polymeric membrane described in the present invention, the process comprising: (a) providing the high selectivity and high $CO_2$ plasticization resistant polymeric membrane which is permeable to at least one gas; (b) contacting the mixture on one side of the membrane to cause the at least one gas to permeate the membrane; and (c) removing from the opposite side of the membrane a permeate gas composition comprising a portion of the at least one gas which permeated said membrane.

The high selectivity and high $CO_2$ plasticization resistant polymeric membrane is especially useful in the purification, separation or adsorption of a particular species in the gas phase. The high selectivity and high $CO_2$ plasticization resistant polymeric membrane is especially useful in gas separation processes in air purification, renewable energy, petrochemical, refinery, and natural gas industries. Examples of such separations include separation of volatile organic compounds (such as toluene, xylene, and acetone) from an atmospheric gas, such as nitrogen or oxygen, and nitrogen recovery from air. Further examples of such separations are for the separation of $CO_2$ and/or $H_2S$ from natural gas or biogas, $H_2$ from $N_2$, $CH_4$, and Ar in ammonia purge gas streams, $H_2$ recovery in refineries, He recovery from natural gas, olefin/paraffin separations such as propylene/propane separation, and iso/normal paraffin separations. Any given pair or group of gases that differ in molecular size, for example nitrogen and oxygen, carbon dioxide and methane, hydrogen and methane or carbon monoxide, helium and methane, can be separated using the high selectivity and high $CO_2$ plasticization resistant polymeric membrane. More than two gases can be removed from a third gas. For example, some of the gas components which can be selectively removed from a raw natural gas using the membrane described herein include carbon dioxide, oxygen, nitrogen, water vapor, hydrogen sulfide, helium, and other trace gases. Some of the gas components that can be selectively retained include hydrocarbon gases. When the permeable components are acid components selected from the group consisting of carbon dioxide, hydrogen sulfide, and mixtures thereof and are removed from a hydrocarbon mixture such as natural gas, one module, or at least two in parallel service, or a series of modules may be utilized to remove the acid components. For example, when one module is utilized, the pressure of the feed gas may vary from 275 kPa to about 2.6 MPa (25 to 4000 psi). The differential pressure across the membrane can be as low as about 70 kPa or as high as 14.5 MPa (about 10 psi or as high as about 2100 psi) depending on many factors such as the particular membrane used, the flow rate of the inlet stream, and the availability of a compressor to compress the permeate stream if such compression is desired. Differential pressure greater than about 14.5 MPa (2100 psi) may rupture the membrane. The operating temperature of the process may vary depending upon the temperature of the feed stream and upon ambient temperature conditions. Preferably, the effective operating temperature of the membranes of the present invention will range from about −50° to about 150° C. More preferably, the effective operating temperature of the high selectivity and high $CO_2$ plasticization resistant polymeric membrane will range from about −50° to about 100° C.

The high selectivity and high $CO_2$ plasticization resistant polymeric membrane is also especially useful in gas/vapor separation processes in chemical, petrochemical, pharmaceutical and allied industries for removing organic vapors from gas streams, e.g., in off-gas treatment for recovery of volatile organic compounds to meet clean air regulations, or within process streams in production plants so that valuable compounds (e.g., vinyl chloride monomer, or propylene) may be recovered. Further examples of gas/vapor separation processes in which the high selectivity and high $CO_2$ plasticization resistant polymeric membrane may be used are hydrocarbon vapor separation from hydrogen in oil and gas refineries, for hydrocarbon dew pointing of natural gas (i.e. to decrease the hydrocarbon dew point to below the lowest possible export pipeline temperature so that liquid hydrocarbons do not separate in the pipeline), for control of methane number in fuel gas for gas engines and gas turbines, and for gasoline recovery. The high selectivity and high $CO_2$ plasticization resistant polymeric membrane may incorporate a species that adsorbs strongly to certain gases (e.g., cobalt porphyrins or phthalocyanines for $O_2$ or silver (I) for ethane) to facilitate their transport across the membrane.

The high selectivity and high $CO_2$ plasticization resistant polymeric membrane described in the present invention may also be used in the separation of liquid mixtures by pervaporation, such as in the removal of organic compounds (e.g., alcohols, phenols, chlorinated hydrocarbons, pyridines, ketones) from water such as aqueous effluents or process fluids. A membrane which is ethanol-selective would be used to increase the ethanol concentration in relatively dilute ethanol solutions (e.g., 5-10% ethanol) obtained by fermentation processes. Another liquid phase separation example using the high selectivity and high $CO_2$ plasticization resistant polymeric membrane is the deep desulfurization of gasoline and diesel fuels by a pervaporation membrane process. The high selectivity and high $CO_2$ plasticization resistant polymeric membrane that is selective to sulfur-containing molecules would be used to selectively remove sulfur-containing molecules from fluid catalytic cracking (FCC) and other naphtha hydrocarbon streams. Further liquid phase examples include the separation of one organic component from another organic component, e.g., to separate isomers of organic compounds. Mixtures of organic compounds which may be separated using the high selectivity and high $CO_2$ plasticization resistant polymeric membrane include: ethylacetate-ethanol, diethylether-ethanol, acetic acid-ethanol, benzene-ethanol, chloroform-ethanol, chloroform-methanol, acetone-isopropylether, allylalcohol-allylether, allylalcohol-cyclohexane, butanol-butylacetate, butanol-1-butylether, ethanol-ethylbutylether, propylacetate-propanol, isopropylether-isopropanol, methanol-ethanol-isopropanol, and ethylacetate-ethanol-acetic acid.

Yet another aspect of the invention is the use of the high selectivity and high $CO_2$ plasticization resistant polymeric membrane material comprising a plurality of repeating units of formula (I) for the preparation of derivative functional polymers that may be used in a wide variety of applications including, but not limited to, fuel cells, electrolyzers, flow batteries, electrodialyzers, waste metal recovery systems, electrocatalytic hydrogen production systems, desalinators, water purifiers, waste water treatment systems, ion exchangers, or $CO_2$ separators.

EXAMPLES

The following examples are provided to illustrate one or more preferred embodiments of the invention but are not limited embodiments thereof. Numerous variations can be made to the following examples that lie within the scope of the invention.

Example 1: Synthesis of poly(p-terphenyl-2,2'-biphenol-1-1-isatin) polymer (abbreviated as poly(TP-DHB-1-1-isatin))

A poly(p-terphenyl-2,2'-biphenol-1-1-isatin) polymer (abbreviated as poly(TP-DHB-1-1-isatin)) was synthesized via a superacid catalyzed polyhydroxyalkylation reaction of monomers 2,2-dihydroxybiphenyl and p-terphenyl with isatin as shown in FIG. 1. The molar ratio of 2,2-dihydroxybiphenyl:p-terphenyl:isatin is 1:1:2. p-terphenyl (5.76 g, 25 mmol) and 2, 2'-biphenol (4.67 g, 25 mmol) were charged to a 500 mL three necked flask equipped with an overhead mechanical stirrer. Anhydrous methylene chloride (50 ml) was added to the flash and stirred for 5 min to form a suspension. The flask was then immersed in an ice bath to keep the suspension at low temperature. A mixture of trifluoromethanesulfonic acid (50 mL), trifluoroacetic acid (25 mL), and isatin (7.36 g, 50 mmol) was added to the flask dropwise. Thereafter, the reaction was continued for 16 h. The resulting viscous solution was poured slowly into a mixture of water and methanol under stirring. The solid was shredded into powders by a blender, filtered, washed with water, and immersed in 0.5 M $K_2CO_3$ overnight to remove the acids completely. The polymer was filtered and washed thoroughly with methanol followed by drying at 80° C. under vacuum. The yield of the polymer poly(TP-DHB-1-1-isatin) was 97%.

Example 2: Synthesis of poly(p-terphenyl-2,2'-biphenol-1-3-isatin) polymer (abbreviated as poly(TP-DHB-1-3-isatin))

A poly(p-terphenyl-2,2'-biphenol-1-3-isatin) polymer (abbreviated as poly(TP-DHB-1-3-isatin)) was synthesized using the synthesis procedure same as that for poly(TP-DHB-1-1-isatin) in Example 1 except that the molar ratio of 2,2-dihydroxybiphenyl to p-terphenyl is 1:3 instead of 1:1. The yield of poly(TP-DHB-1-3-isatin) was about 96%.

Example 3: Synthesis of poly(p-terphenyl-2,2'-biphenol-1-3-isatin-2,2,2-trifluoroacetophenone-4-1) polymer (abbreviated as poly(TP-DHB-1-3-isatin-TFAP-4-1))

Figure 2:
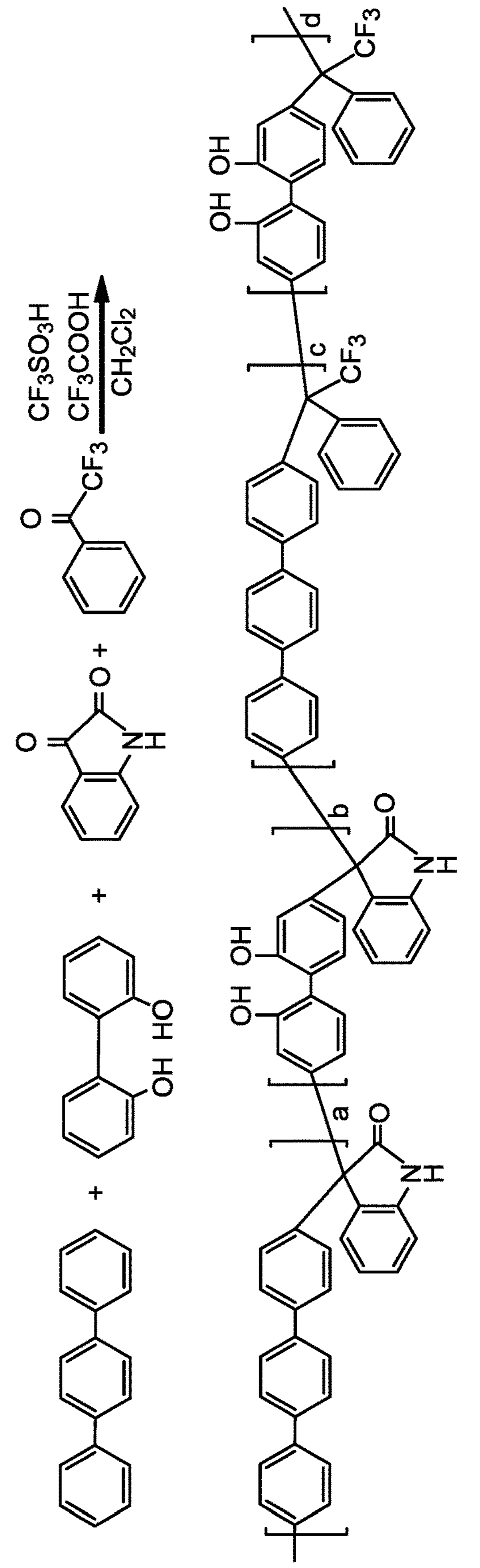
FIG. 2 is an illustration of one embodiment of the synthesis of poly(TP-DHB-1-3-isatin-TFAP-4-1) polymer.

A poly(p-terphenyl-2,2'-biphenol-1-3-isatin-2,2,2-trifluoroacetophenone-4-1) polymer (abbreviated as poly(TP-DHB-1-3-isatin-TFAP-4-1)) was synthesized via a superacid catalyzed polyhydroxyalkylation reaction of monomers 2,2-dihydroxybiphenyl and p-terphenyl with isatin and 2,2,2-trifluoroacetophenone as shown in FIG. 2. The molar ratio of 2,2-dihydroxybiphenyl:p-terphenyl:isatin:2,2,2-trifluoroacetophenone is 1:1:1.6:0.4. p-terphenyl (5.76 g, 25 mmol) and 2, 2'-biphenol (4.67 g, 25 mmol) were charged to a 500 mL three necked flask equipped with an overhead mechanical stirrer. Anhydrous methylene chloride (50 ml) was added to the flash and stirred for 5 min to form a suspension. The flask was then immersed in an ice bath to keep the suspension at low temperature. A mixture of trifluoromethanesulfonic acid (50 mL), trifluoroacetic acid (25 mL), isatin (5.89 g, 40 mmol), and 2,2,2-trifluoroacetophenone (1.74 g, 10 mmol) was added to the flask dropwise. Thereafter, the reaction was continued for 14 h. The resulting viscous solution was poured slowly into a mixture of water and methanol under stirring. The solid was shredded into powders by a blender, filtered, washed with water, and immersed in 0.5 M $K_2CO_3$ overnight to remove the acids completely. The polymer was filtered and washed thoroughly with methanol followed by drying at 80° C. under vacuum. The yield of the polymer poly(TP-DHB-1-3-isatin-TFAP-4-1) was 96%.

Example 4: Preparation of poly(TP-DHB-1-1-isatin) dense film membrane

A poly(TP-DHB-1-1-isatin) dense film membrane was prepared by dissolving 5.0 g of poly(TP-DHB-1-1-isatin) polymer synthesized in Example 1 in 20.0 g of DMSO solvent, casting the solution on a clean glass plate, and drying at 60° C. for 12 h. The membrane was peeled off from the glass plate and further dried in a vacuum oven at 120° C. for 48 h.

Example 5: Preparation of poly(TP-DHB-1-3-isatin) dense film membrane

A poly(TP-DHB-1-3-isatin) dense film membrane was prepared using a procedure same as that used for poly(TP-DHB-1-1-isatin) dense film membrane as described in Example 4.

Comparative Example 1: Preparation of Cellulose Acetate (CA)/Cellulose Triacetate (CTA) Blend Dense Film Membrane (Abbreviated as CA/CTA)

0.5 g of cellulose acetate (CA) polymer and 0.5 g of cellulose triacetate (CTA) polymer were dissolved in 20.0 g of NMP solvent. The mixture was stirred at room temperature for about 6 h to form a homogeneous solution. The solution was cast onto the surface of a clean glass plate, and dried at 60° C. for 12 h. The membrane was peeled off from the glass plate and further dried in a vacuum oven at 120° C. for 48 h.

Comparative Example 2: Preparation of Polyimide Dense Film Membrane (Abbreviated as PI)

5.0 g of polyimide polymer (Matrimid® available from Huntsman Corporation) was dissolved in 20.0 g of NMP solvent. The mixture was stirred at room temperature for about 3 h to form a homogeneous solution. The solution was cast onto the surface of a clean glass plate, and dried at 60° C. for 12 h. The membrane was peeled off from the glass plate and further dried in a vacuum oven at 120° C. for 48 h.

Example 6: Evaluation of Gas Permeation Properties of Poly(TP-DHB-1-1-Isatin) and Poly(TP-DHB-1-3-Isatin) Dense Film Membranes The gas permeation properties of poly(TP-DHB-1-1-isatin) (Example 4), poly(TP-DHB-1-3-isatin) (Example 5), CA/CTA (Comparative Example 1), and PI (Comparative Example 2) dense film membranes for $CO_2/CH_4$ and $H_2/CH_4$ separations were evaluated using a fixed volume gas permeation testing unit at 50° C. under 791 kPa (100 psig) pure single feed gas pressure. The results were showed in Table 1.

It can be seen from Table 1 that poly(TP-DHB-1-1-isatin) and poly(TP-DHB-1 isatin) membranes have similar $CO_2$ permeability, higher $H_2$ permeability, higher $CO_2/CH_4$ selectivity, and higher $H_2/CH_4$ selectivity than the CA/CTA membrane for $CO_2/CH_4$ and $H_2/CH_4$ separations. Poly(TP-DHB-1-1-isatin) and poly(TP-DHB-1-3-isatin) membranes also have higher $CO_2/CH_4$ selectivity and higher $H_2/CH_4$ selectivity than the PI membrane for $CO_2/CH_4$ and $H_2/CH_4$ separations. Furthermore, poly(TP-DHB-1-1-isatin) and poly(TP-DHB-1-3-isatin) dense film membranes showed significantly higher $CO_2$ plasticization resistance than the PI and CA/CTA membranes for natural gas upgrading and biogas purification applications.

Figure 3:
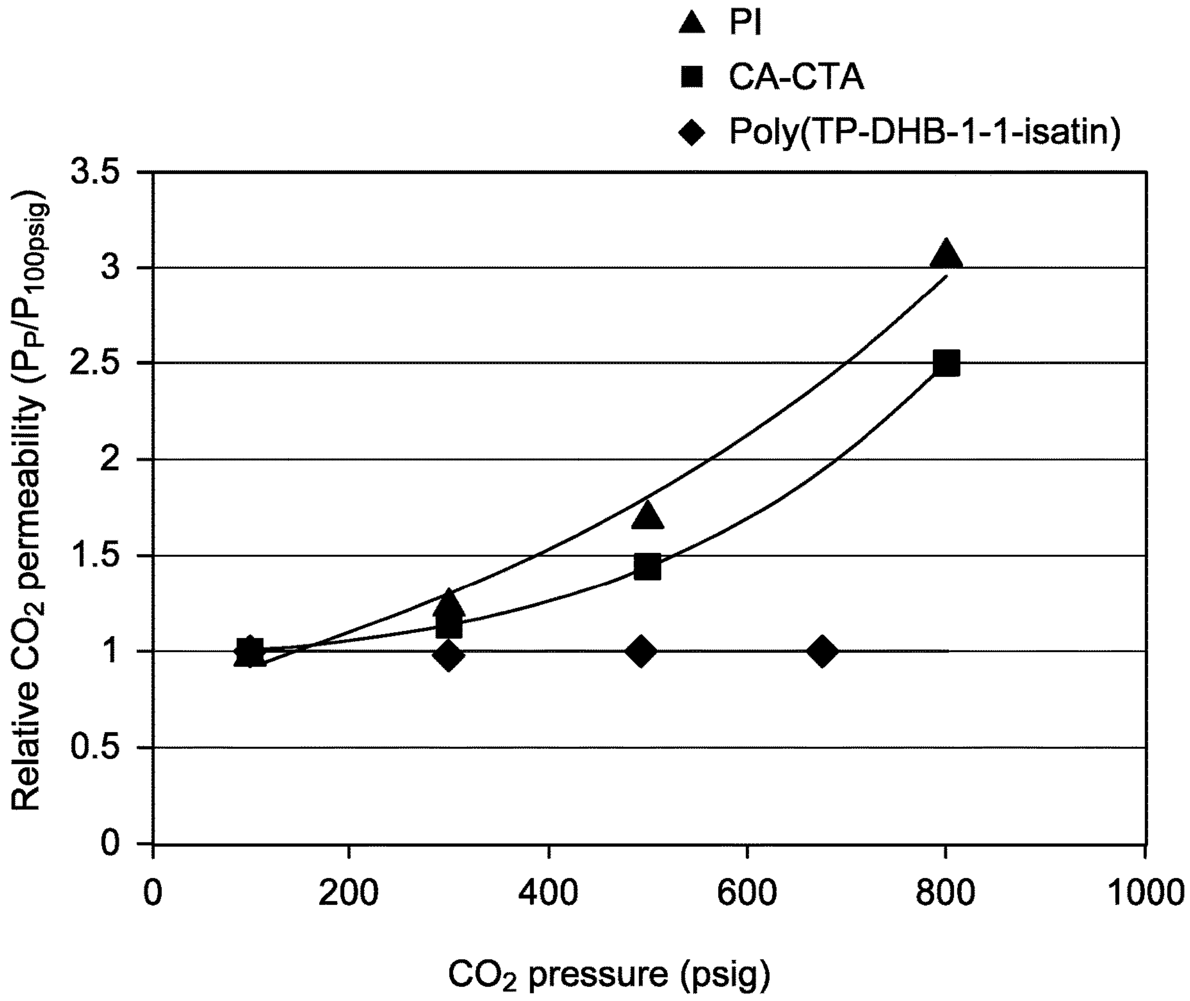
FIG. 3 is a graph showing the effect of applied $CO_2$ pressures on the relative $CO_2$ permeabilities of different membranes at 50° C.

To study the $CO_2$ plasticization resistance of poly(TP-DHB-1-1-isatin), CA/CTA, and PI dense film membranes, the membranes were conditioned with $CO_2$ at different pressures. FIG. 3 shows the change of $CO_2$ relative permeability with the increase of the applied $CO_2$ pressure at 50° C. for all the membranes. The CA/CTA membrane showed a 44% increase in $CO_2$ permeability under the applied $CO_2$ pressure of 500 psig compared to the permeability at 100 psig applied $CO_2$ pressure. When the applied $CO_2$ pressure increased to 800 psig, the CA/CTA membrane showed 149% increase in $CO_2$ permeability. Similarly, the PI membrane showed 71% increase in $CO_2$ permeability under the applied $CO_2$ pressure of 500 psig compared to the permeability at 100 psig applied $CO_2$ pressure. When the applied $CO_2$ pressure increased to 800 psig, the PI membrane showed 209% increase in $CO_2$ permeability. The significant $CO_2$ permeability increase when the applied $CO_2$ pressure is approximately above 300 psig is due to the $CO_2$ plasticization (swelling) of the CA/CTA blend polymers and the PI polymer, respectively. However, no $CO_2$ plasticization was observed for the poly(TP-DHB-1-1-isatin) membrane up to 675 psig applied $CO_2$ pressure. The significant enhancement in $CO_2$ plasticization resistance for the poly(TP-DHB-1-1-isatin) membrane compared to the CA/CTA and PI membranes is mainly attributed to the rigid polymer chain structure and the formation of H-bonding among the polymer chains. These results indicate that poly(TP-DHB-1-1-isatin) membrane is a good candidate membrane for natural gas upgrading and biogas purification applications.

TABLE 1

| Membrane | $P_{CO2}$ (Barrer) | $\alpha_{CO2/CH4}$ | $P_{H2}$ (Barrer) | $\alpha_{H2/CH4}$ |
|---|---|---|---|---|
| CA/CTA | 8.74 | 21.3 | 19.5 | 48.1 |
| PI | 10.0 | 28.2 | 33.1 | 93.2 |
| Poly(TP-DHB-1-1-isatin) | 11.3 | 31.9 | 36.5 | 123.0 |
| Poly(TP-DHB-1-3-isatin) | 8.25 | 33.8 | 26.3 | 136.2 |

[a] $P_{CO2}$, $P_{H2}$, and $P_{CH4}$ were tested at 50° C. and 690 kPa (100 psig);
1 Barrer = $10^{-10}$ $cm^3$(STP) · cm/$cm^2$ · sec · cmHg.

Example 7: Preparation of poly(TP-DHB-1-3-isatin-TFAP-4-1) hollow fiber membrane A hollow fiber spinning dope containing 26.0 wt-% of poly(TP-DHB-1-3-isatin-TFAP-4-1) polymer synthesized in Example 3 was prepared. The spinning dope was extruded at a flow rate of 3.5 mL/min through a spinneret at 50° C. spinning temperature. A bore fluid containing 10% by weight of water in NMP was injected to the bore of the fiber at a flow rate of 0.7 mL/min simultaneously with the extruding of the spinning dope. The nascent fiber traveled through an air gap length of 5 cm at room temperature with a humidity of less than 40%, was immersed into a water coagulant bath at 10° C. and wound at a rate of 37.7 m/min. The water-wet fibers were cut into certain length and assembled together as a bundle. The water-wet hollow fiber bundle was solvent exchanged with methanol three times for 30 minutes each time, and then annealed in a hot water bath at 85° C. for 30 minutes. The annealed water-wet hollow fiber bundle was dried at 85° C. in an oven for 1.5 hours to form poly(TP-DHB-1-3-isatin-TFAP-4-1) polymeric hollow fiber membrane.

Example 8: Preparation of poly(TP-DHB-1-1-isatin) asymmetric flat sheet membrane An asymmetric flat sheet membrane casting dope containing 19.0 wt-% of poly(TP-DHB-1-1-isatin) polymer synthesized in Example 1 was prepared. The casting dope was cast on a highly porous non-selective symmetric woven Nylon 6,6 fabric backing at a casting speed of 6 fpm at room temperature. The cast membrane was evaporated for 13 seconds to form the nascent asymmetric integrally-skinned flat sheet membrane with a thin dense selective skin layer on the surface. The membrane was immersed into a cold water coagulation tank to generate the porous non-selective asymmetric layer below the thin dense selective skin layer by phase inversion. The wet membrane was then immersed into a hot water tank to remove the trace amount of organic solvents in the membrane. Finally, the wet membrane was wound up on a core roll for further drying. The wet membrane was dried at 75° C. The thin dense selective skin layer surface of the dried membrane was then coated with a thin non-porous layer of epoxysilicone rubber. The epoxysilicone rubber coating layer was cross-linked via UV radiation for 1.75 min using a UV lamp to produce poly(TP-DHB-1-1-isatin) asymmetric integrally-skinned flat sheet membrane.

SPECIFIC EMBODIMENTS

While the following is described in conjunction with specific embodiments, it will be understood that this description is intended to illustrate and not limit the scope of the preceding description and the appended claims.

A first embodiment of the invention is a polymer comprising a plurality of repeating units of formula (I)

(I)

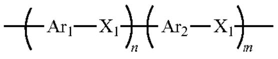

wherein $Ar_1$ is selected from the group consisting of

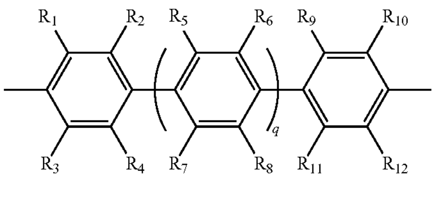

,

-continued
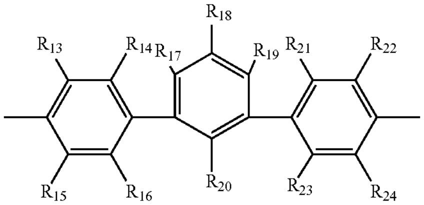
,
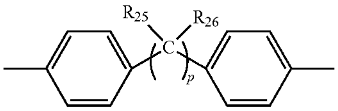
,
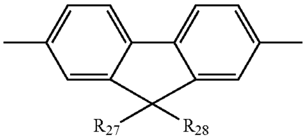
,
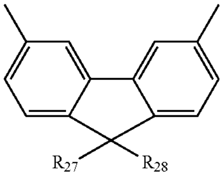
,
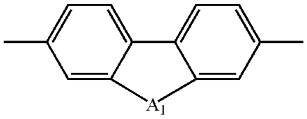
,
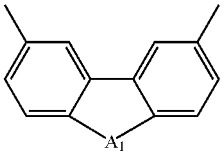
,
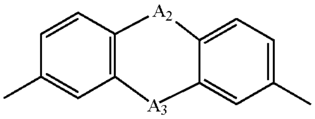
and mixtures thereof; wherein $Ar_2$ is selected from the group consisting of
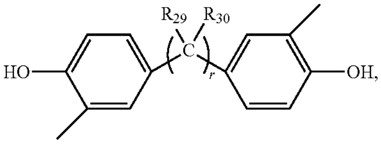
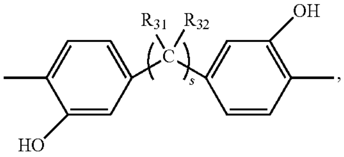
,
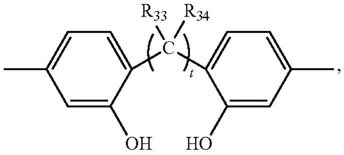
,
-continued
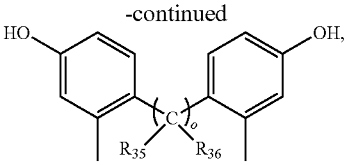
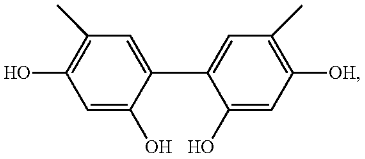
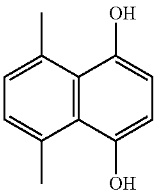
,
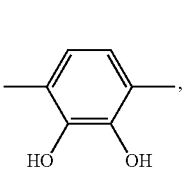
,
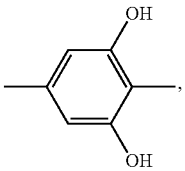
,
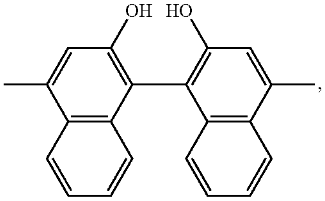
,
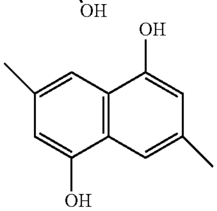
,
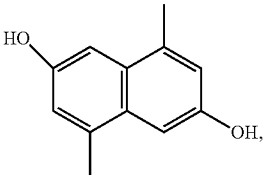
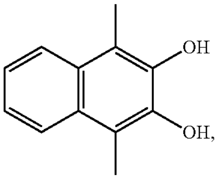
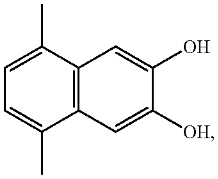
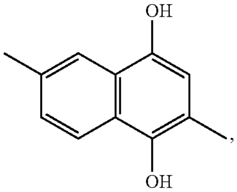
,
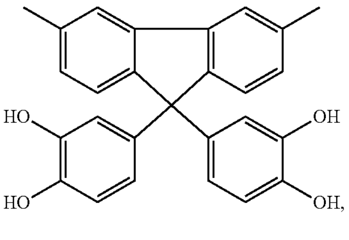
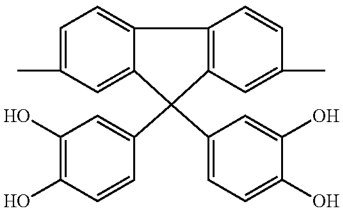

and mixtures thereof; wherein $X_1$ is selected from the group consisting of

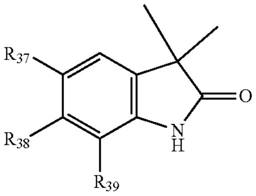

or a mixture of

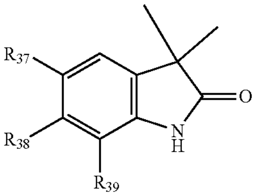

and one or more of

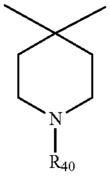

and

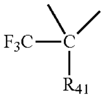

wherein $R_1$-$R_{36}$ are each independently hydrogen, a halogen, an alkyl group, an alkenyl group, an alkynyl group, or an aryl group, and wherein the alkyl group, the alkenyl group, the alkynyl group, or the aryl group is optionally substituted with a halogen; wherein $R_{37}$-$R_{40}$ are each independently hydrogen, an alkyl group, an alkenyl group, an alkynyl group, or an aryl group, and wherein the alkyl group, the alkenyl group, the alkynyl group or the aryl group is optionally substituted with a halogen; wherein $R_{41}$ is an alkyl group, an alkenyl group, an alkynyl group, or an aryl group, and wherein the alkyl group, the alkenyl group, the alkynyl group, or the aryl group is optionally substituted with a halogen; wherein the halogen is F, Cl, Br, or I; wherein $A_1$, $A_2$, and $A_3$ are each independently O, S, or NH; wherein m is an integer from 5 to 5000; wherein n is an integer from 0 to 5000; wherein a molar ratio of n/m is in a range of 0:1 to 20:1; wherein p is 1, 2, 3, or 4; wherein q is 0, 1, 2, or 3; wherein r, s, t, and o are independently 0, 1, 2, or 3. An embodiment of the invention is one, any or all of prior embodiments in this paragraph up through the first embodiment in this paragraph wherein $Ar_1$ is selected from the group consisting of

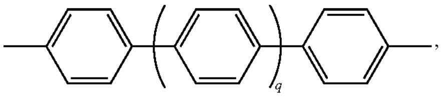,

-continued

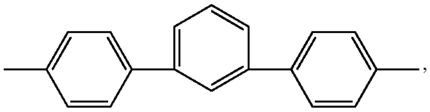,

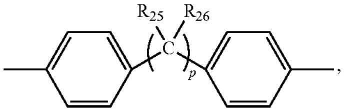,

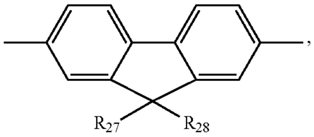,

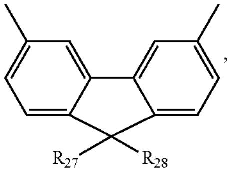,

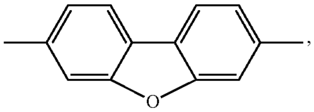,

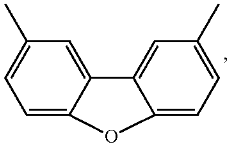,

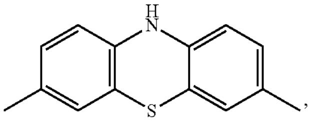,

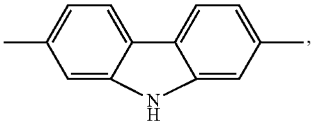,

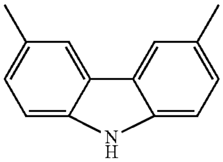

and mixtures thereof, wherein $R_{25}$, $R_{26}$, $R_{27}$, and $R_{28}$ are each independently —H or —$CH_3$; wherein p is 1 or 2; and wherein q is 0 or 1. An embodiment of the invention is one, any or all of prior embodiments in this paragraph up through the first embodiment in this paragraph wherein $Ar_2$ is selected from the group consisting of

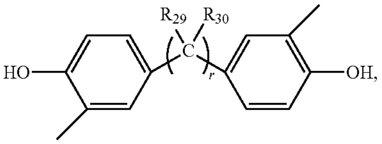

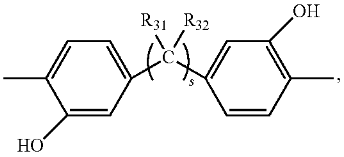,

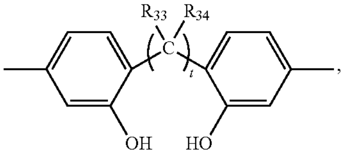,

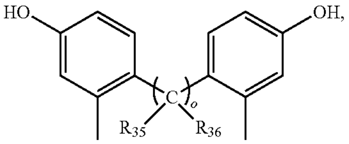

-continued

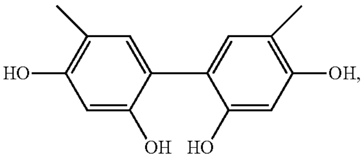

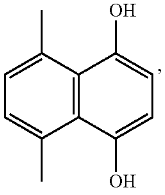
,

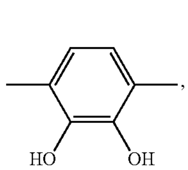
,

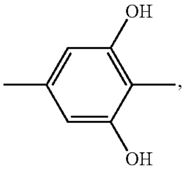
,

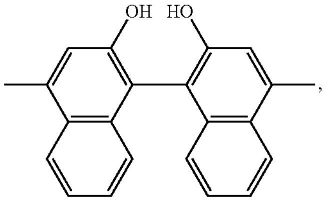
,

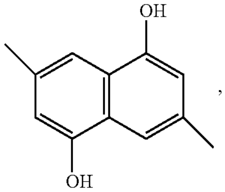
,

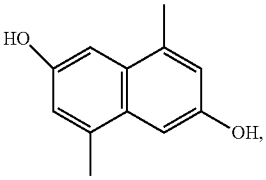

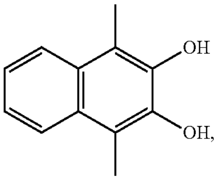

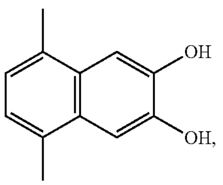

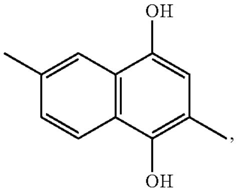
,

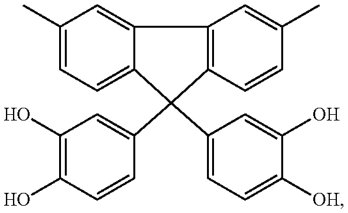

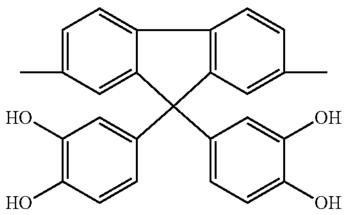

and mixtures thereof; wherein $R_{29}$, $R_{30}$, $R_{31}$, $R_{32}$, $R_{33}$, $R_{34}$, $R_{35}$, and $R_{36}$ are each independently $—CH_3$ or $—CF_3$; and wherein r, s, t, and o are each independently 0 or 1. An embodiment of the invention is one, any or all of prior embodiments in this paragraph up through the first embodiment in this paragraph wherein $X_1$ is

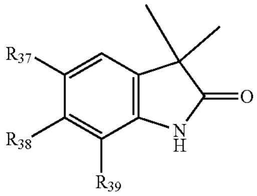

wherein $R_{37}$, $R_{38}$, and $R_{39}$ are each independently —H, $—CH_3$, $—CH_2CH_3$, $—CH(CH_3)_2$, $—C(CH_3)_3$, $—CH_2—C_6H_5$, or $—CH_2—CH(CH_3)_2$. An embodiment of the invention is one, any or all of prior embodiments in this paragraph up through the first embodiment in this paragraph wherein $X_1$ is a mixture of

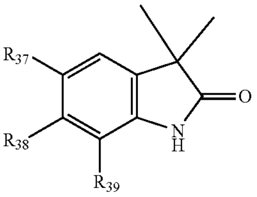

and

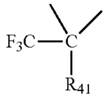

wherein $R_{37}$, $R_{38}$, and $R_{39}$ are each independently —H, $—CH_3$, $—CH_2CH_3$, $—CH(CH_3)_2$, $—C(CH_3)_3$, $—CH_2—C_6H_5$, or $—CH_2—CH(CH_3)_2$; and wherein Ru is $—CH_3$, $—CH_2CH_3$, or $—C_6H_5$. An embodiment of the invention is one, any or all of prior embodiments in this paragraph up through the first embodiment in this paragraph wherein $X_1$ is a mixture of

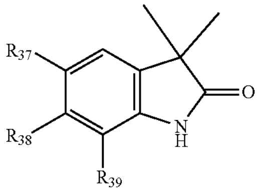

and

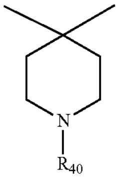

wherein $R_{37}$, $R_{38}$, $R_{39}$, and $R_{40}$ are each independently —H, $—CH_3$, $—CH_2CH_3$, $—CH(CH_3)_2$, $—C(CH_3)_3$, $—CH_2—C_6H_5$, or $—CH_2—CH(CH_3)_2$. An embodiment of the invention is one, any or all of prior embodiments in this paragraph up through the first embodiment in this paragraph wherein $X_1$ is a mixture of

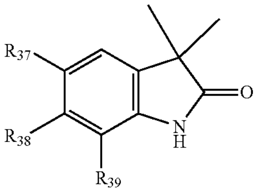
,

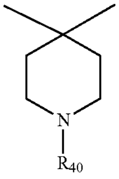
, and

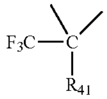

wherein $R_{37}$, $R_{38}$, $R_{39}$, and $R_{40}$ are each independently —H, —$CH_3$, —$CH_2CH_3$, —$CH(CH_3)_2$, —$C(CH_3)_3$, —$CH_2$—$C_6H_5$, or —$CH_2$—$CH(CH_3)_2$; and wherein $R_{41}$ is —$CH_3$, —$CH_2CH_3$, or —$C_6H_5$. An embodiment of the invention is one, any or all of prior embodiments in this paragraph up through the first embodiment in this paragraph wherein the polymer is synthesized by reacting monomers $Ar_1'$, $Ar_2'$, and $X_1'$ in a superacid catalyzed polyhydroxyalkylation reaction, wherein $Ar_1'$ is selected from the group consisting of

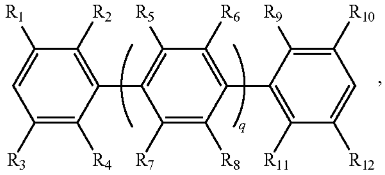
,
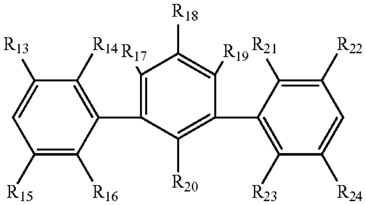
,
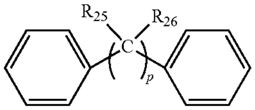
,
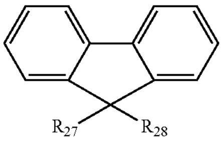
,
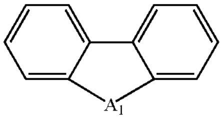
,
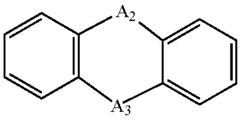

and mixtures thereof; wherein $Ar_2'$ is selected from the group consisting of

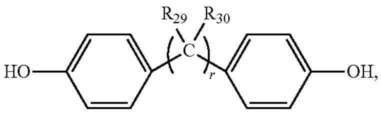
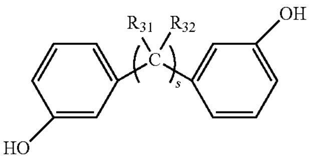
,
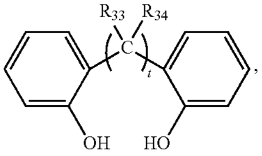
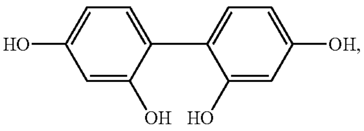
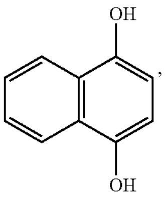

-continued

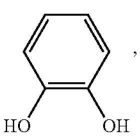
,
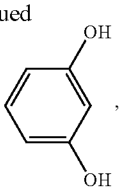
,
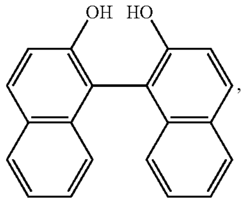
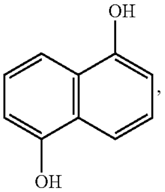
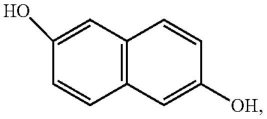
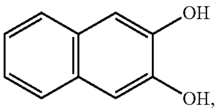
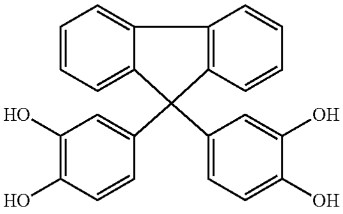 [SMILES: Oc1ccc(C2(c3ccc(O)c(O)c3)c3ccccc3-c3ccccc32)cc1O]

and mixtures thereof; and wherein $X_1'$ is selected from the group consisting of

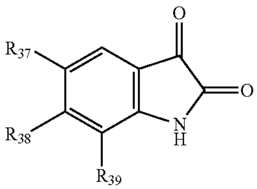

or a mixture of

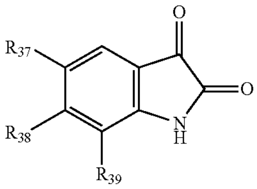

and one or more of

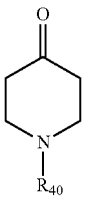

and

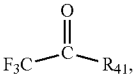

wherein $R_1$-$R_{34}$ are each independently hydrogen, a halogen, an alkyl group, an alkenyl group, an alkynyl group, or an aryl group, and wherein the alkyl group, the alkenyl group, the alkynyl group, or the aryl group is optionally substituted with a halogen; wherein $R_{37}$-$R_{40}$ are each independently hydrogen, an alkyl group, an alkenyl group, an alkynyl group, or an aryl group, and wherein the alkyl group, the alkenyl group, the alkynyl group, or the aryl group is optionally substituted with a halogen; wherein Ru is an alkyl group, an alkenyl group, an alkynyl group, or an aryl group, and wherein the alkyl group, the alkenyl group, the alkynyl group, or the aryl group is optionally substituted with a halogen; wherein $A_1$, $A_2$, and $A_3$ are each independently O, S, or NH; wherein p is 1, 2, 3, or 4; wherein q is 0, 1, 2, or 3; and wherein r, s, and t are independently 0, 1, 2, or 3. An embodiment of the invention is one, any or all of prior embodiments in this paragraph up through the first embodiment in this paragraph wherein $Ar_2'$ is selected from the group consisting of

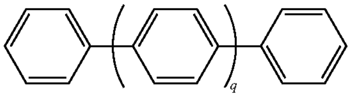

,

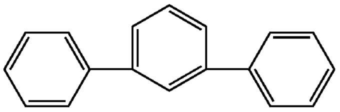

,

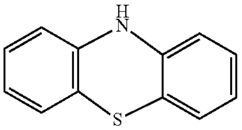

,

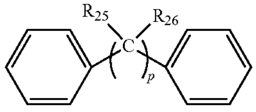

,

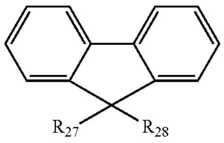

,

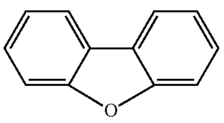

,

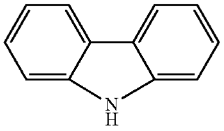

and mixtures thereof, wherein $R_{25}$, $R_{26}$, $R_{27}$, and $R_{28}$ are each independently —H or —$CH_3$; wherein p is 1 or 2; and wherein q is 0 or 1. An embodiment of the invention is one, any or all of prior embodiments in this paragraph up through the first embodiment in this paragraph wherein $Ar_2'$ is selected from the group consisting of

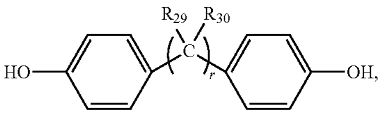

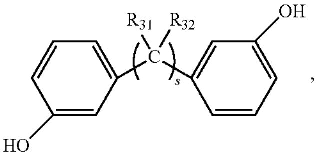

,

-continued

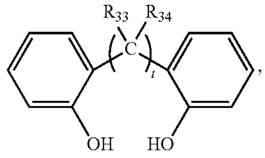

,

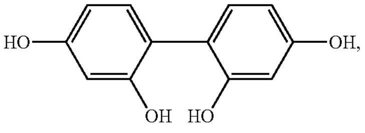

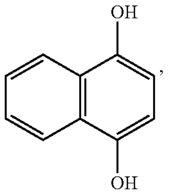

,

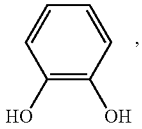

,

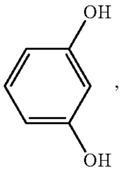

,

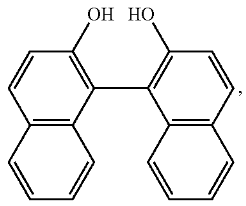

,

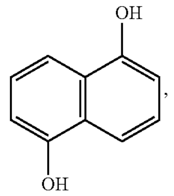

,

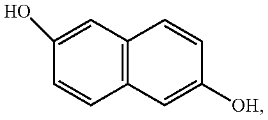

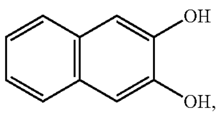

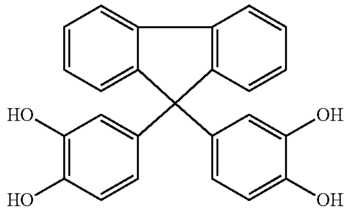 [SMILES: Oc1ccc(C2(c3ccc(O)c(O)c3)c3ccccc3-c3ccccc32)cc1O]

and mixtures thereof; wherein $R_{29}$, $R_{30}$, $R_{31}$, $R_{32}$, $R_{33}$, and $R_{34}$ are each independently —$CH_3$ or —$CF_3$; wherein r, s, and t are independent 0 or 1. An embodiment of the invention is one, any or all of prior embodiments in this paragraph up through the first embodiment in this paragraph wherein $X_1'$ is

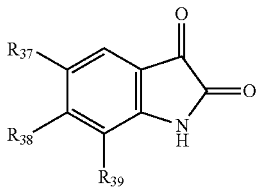

wherein $R_{37}$, $R_{38}$, and $R_{39}$ are each independently —H, —$CH_3$, —$CH_2CH_3$, —$CH(CH_3)_2$, —$C(CH_3)_3$, —$CH_2$—$C_6H_5$, or —$CH_2$—$CH(CH_3)_2$. An embodiment of the invention is one, any or all of prior embodiments in this paragraph up through the first embodiment in this paragraph wherein $X_1'$ is a mixture of

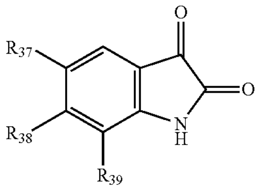

and

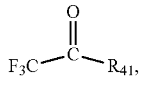

wherein $R_{37}$, $R_{38}$, and $R_{39}$ are each independently —H, —$CH_3$, —$CH_2CH_3$, —$CH(CH_3)_2$, —$C(CH_3)_3$, —$CH_2$—$C_6H_5$, or —$CH_2$—$CH(CH_3)_2$; and wherein Ru is —$CH_3$, —$CH_2CH_3$, or —$C_6H_5$. An embodiment of the invention is one, any or all of prior embodiments in this paragraph up through the first embodiment in this paragraph wherein $X_1$' is a mixture of

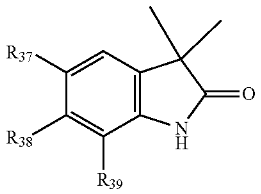

and

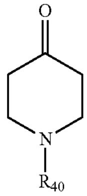

wherein $R_{37}$, $R_{38}$, $R_{39}$, and $R_{40}$ are each independently —H, —$CH_3$, —$CH_2CH_3$, —$CH(CH_3)_2$, —$C(CH_3)_3$, —$CH_2$—$C_6H_5$, or —$CH_2$—$CH(CH_3)_2$. An embodiment of the invention is one, any or all of prior embodiments in this paragraph up through the first embodiment in this paragraph wherein $X_1$' is a mixture of

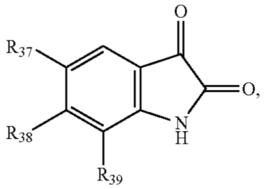

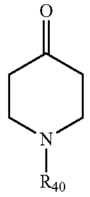

and

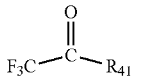

wherein $R_{37}$, $R_{38}$, $R_{39}$, and $R_{40}$ are each independently —H, —$CH_3$, —$CH_2CH_3$, —$CH(CH_3)_2$, —$C(CH_3)_3$, —$CH_2$—$C_6H_5$, or —$CH_2$—$CH(CH_3)_2$; and wherein $R_{41}$ is —$CH_3$, —$CH_2CH_3$, or —$C_6H_5$.

A second embodiment of the invention is a membrane made from the polymer of the first embodiment.

A third embodiment of the invention is a process for separating at least one gas from a mixture of gases, the process comprising (a) providing a membrane made from the polymer of the first embodiment; (b) contacting the mixture of gases to one side of the membrane to cause the at least one gas to permeate the membrane; and (c) removing from the opposite side of the membrane a permeate gas composition comprising a portion of the at least one gas which permeated the membrane. An embodiment of the invention is one, any or all of prior embodiments in this paragraph up through the third embodiment in this paragraph wherein the mixture of gases comprises hydrogen sulfide and carbon dioxide in natural gas. An embodiment of the invention is one, any or all of prior embodiments in this paragraph up through the third embodiment in this paragraph wherein the mixture of gases comprises hydrogen sulfide and carbon dioxide in biogas. An embodiment of the invention is one, any or all of prior embodiments in this paragraph up through the third embodiment in this paragraph wherein the mixture of gases comprises hydrogen in a mixture of nitrogen, methane. An embodiment of the invention is one, any or all of prior embodiments in this paragraph up through the third embodiment in this paragraph wherein the mixture of gases comprises carbon dioxide in flue gas.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

What is claimed is:

1. A polymer comprising a plurality of repeating units of formula (I)

$$-\left(Ar_1-X_1\right)_n\left(Ar_2-X_1\right)_m- \quad (I)$$

wherein $Ar_1$ s selected from the group consisting of:

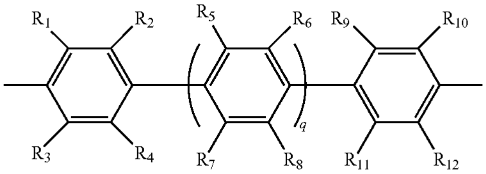

,

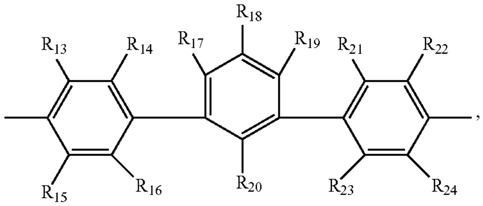

,

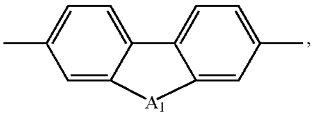

,

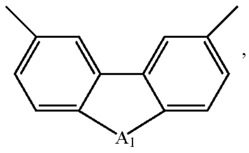

,

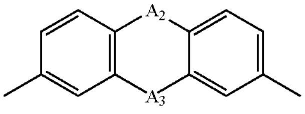

-continued
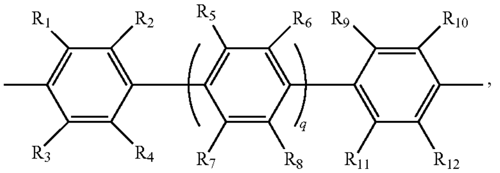
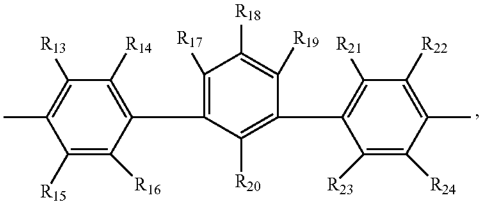
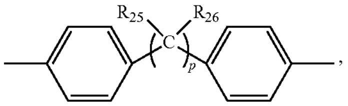
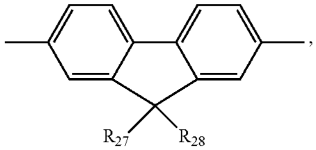
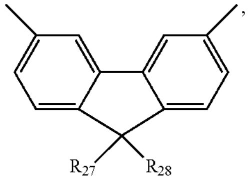
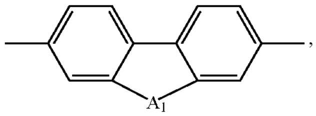
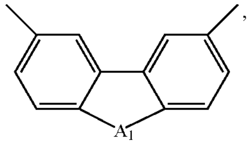
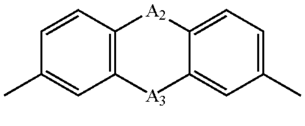
and mixtures thereof,
wherein $Ar_2$ is selected from the group consisting of:
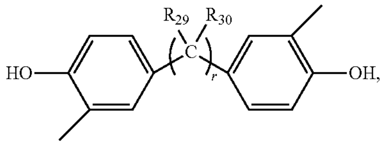
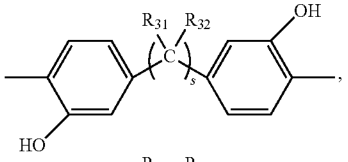
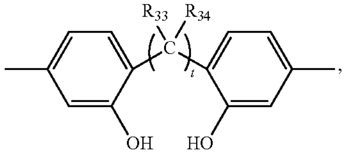
-continued
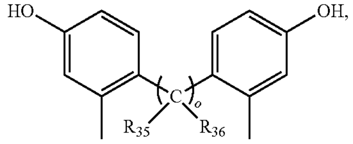
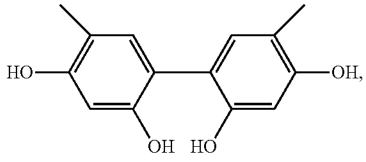
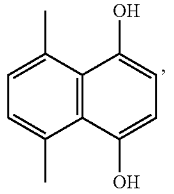
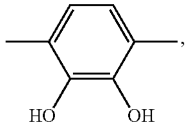
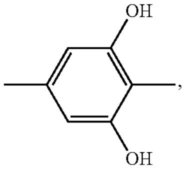
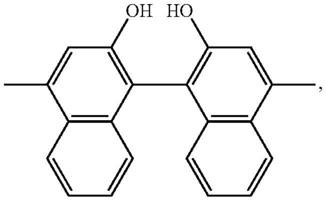
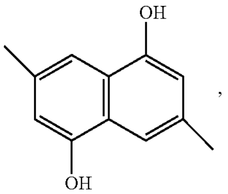
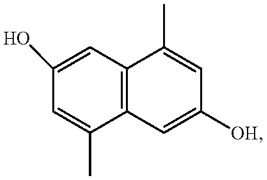
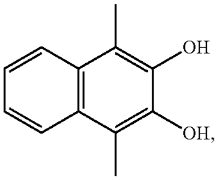
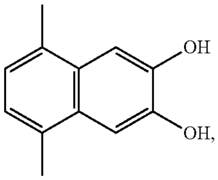
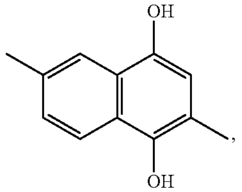
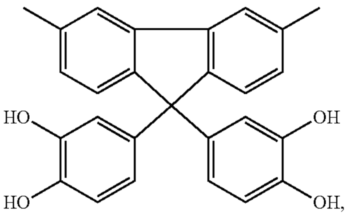
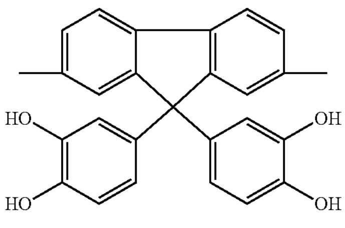

and mixtures thereof;

wherein $X_1$ is a mixture of

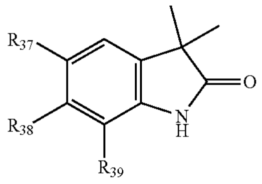

and

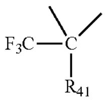

and optionally

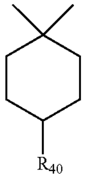

wherein $R_1$-$R_{36}$ are each independently hydrogen, a halogen, an alkyl group, an alkenyl group, an alkynyl group, or an aryl group, and wherein the alkyl group, the alkenyl group, the alkynyl group, or the aryl group is optionally substituted with a halogen;

wherein the halogen is F, Cl, Br, or I;

wherein $A_1$, $A_2$, and $A_3$ are each independently O, S, or NH;

wherein m is an integer from 5 to 5000;

wherein n is an integer from 0 to 5000;

wherein a molar ratio of n/m is in a range of 0:1 to 20:1;

wherein p is 1, 2, 3 or 4;

wherein q is 0, 1, 2, or 3; and wherein r, s, t, and o are independently 0, 1, 2, or 3, wherein $R_{37}$, $R_{38}$, $R_{39}$ and $R_{40}$ are each independently $—H$, $—CH_3$, $—CH_2CH_3$, $—CH(CH_3)_2$, $—C(CH_3)_3$, $—CH_2—C_6H_5$, or $—CH_2—CH(CH_3)_2$; and wherein $R_{41}$ is $—CH_3$, $—CH_2CH_3$, or $—C_6H_5$.

2. The polymer of claim 1 wherein Aris selected from the group consisting of:

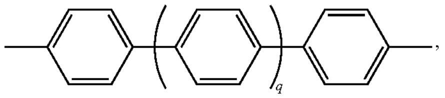,

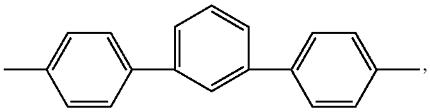,

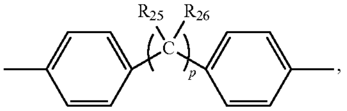,

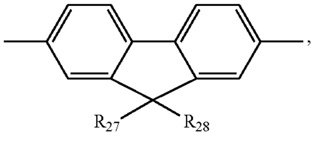, 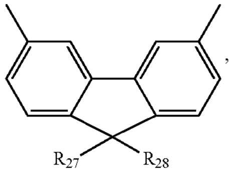,

-continued

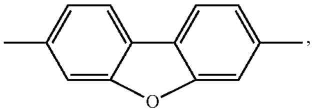, 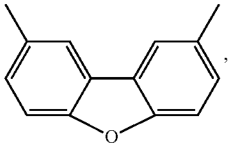,

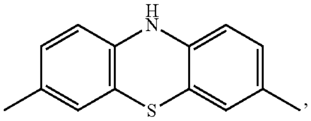,

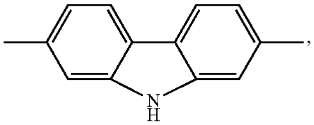, 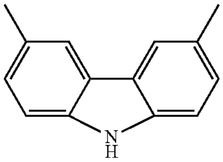

and mixtures thereof, wherein $R_{25}$, $R_{26}$, $R_{27}$, and $R_{28}$ are each independently —H or $—CH_3$;

wherein p is 1 or 2; and wherein q is 0 or 1.

3. The polymer of claim 1 wherein $Ar_2$ is selected from the group consisting of:

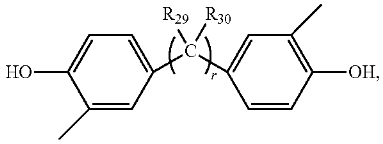

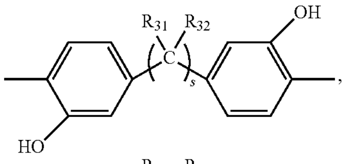,

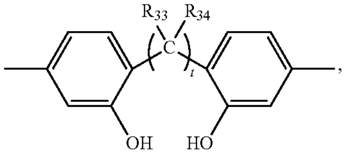,

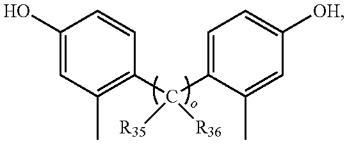

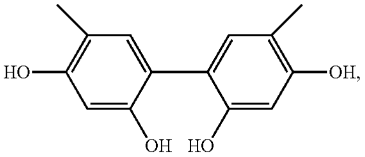 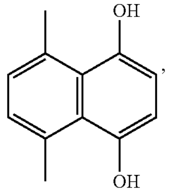,

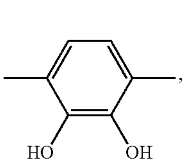, 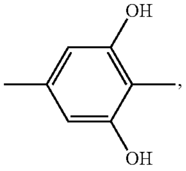,

-continued

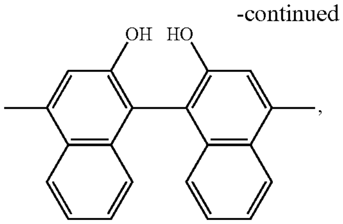

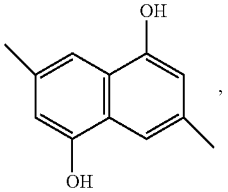

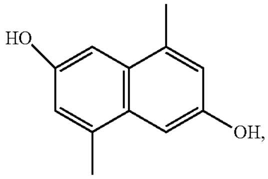

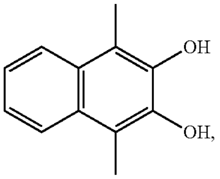

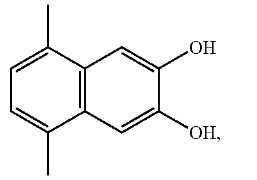

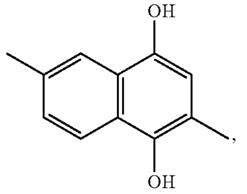

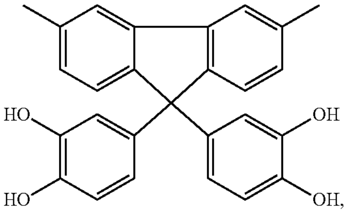

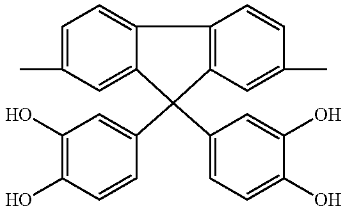

and mixtures thereof;

wherein $R_{29}$, $R_{30}$, $R_{31}$, $R_{32}$, $R_{33}$, $R_{34}$, $R_{35}$, and $R_{36}$ are each independently-$CH_3$ or —$CF_3$, and wherein r, s, t, and o are each independently 0 or 1.

4. The polymer of claim 1 wherein $X_1$ is a mixture of

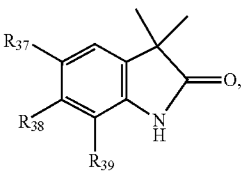

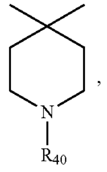

and

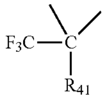

wherein $R_{37}$, $R_{38}$, $R_{39}$, and $R_{40}$ are each independently —H, —$CH_3$, —$CH_2CH_3$, —$CH(CH_3)_2$, —$C(CH_3)_3$, —$CH_2$—$C_6H_5$, or —$CH_2$—$CH(CH_3)_2$; and wherein $R_{41}$ is —$CH_3$, —$CH_2CH_3$, or —$C_6H_5$.

5. The polymer of claim 1 wherein the polymer is synthesized by reacting monomers $Ar_1'$, $Ar_2'$, and $X_1'$ in a superacid catalyzed polyhydroxyalkylation reaction, wherein $Ar_1'$ is selected from the group consisting of:

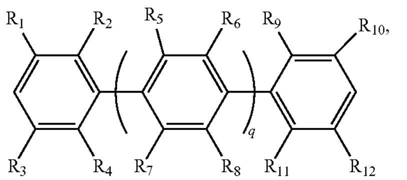

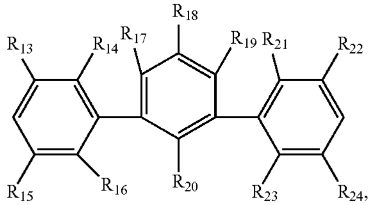

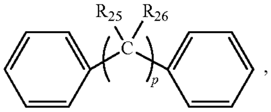

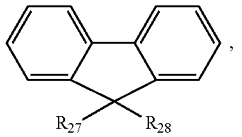

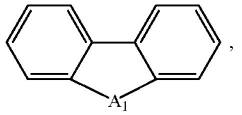

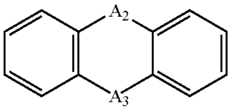

and mixtures thereof;

wherein $Ar_2'$ is selected from the group consisting of:

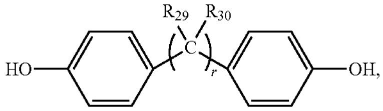

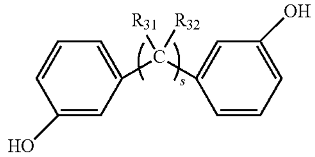

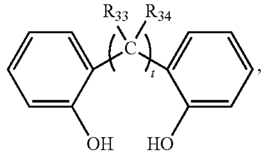

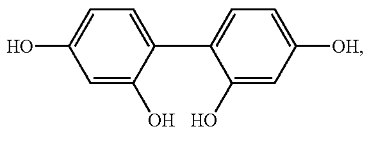

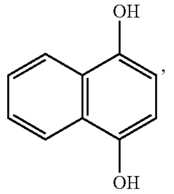

-continued

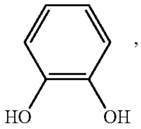,
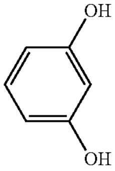,
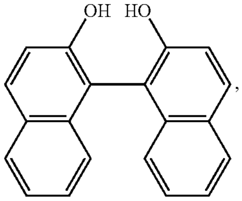,
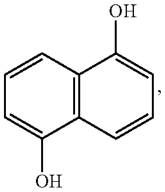,
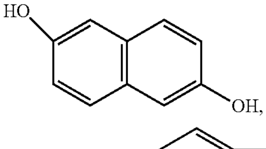
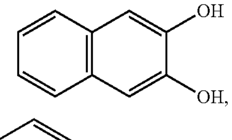
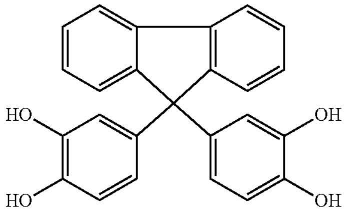 [SMILES: Oc1ccc(C2(c3ccc(O)c(O)c3)c3ccccc3-c3ccccc32)cc1O]

and mixtures thereof; and wherein $X_1'$ is a mixture of

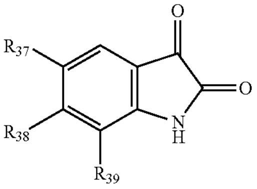
and
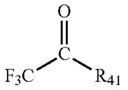

and optionally

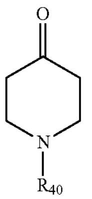

wherein $R_1$-$R_{34}$ are each independently hydrogen, a halogen, an alkyl group, an alkenyl group, an alkynyl group, or an aryl group, and wherein the alkyl group, the alkenyl group, the alkynyl group, or the aryl group is optionally substituted with a halogen;

wherein $A_1$, $A_2$, and $A_3$ are each independently O, S, or NH;

wherein p is 1, 2, 3, or 4;

wherein q is 0, 1, 2, or 3; and wherein r, s, and t are independently 0, 1, 2, or 3, wherein $R_{37}$, $R_{38}$, $R_{39}$ and $R_{40}$ are each independently —H, —$CH_3$, —$CH_2CH_3$, —$CH(CH_3)_2$, —$C(CH_3)_3$, —$CH_2$—$C_6H_5$, or —$CH_2$—$CH(CH_3)_2$; and wherein $R_{41}$ is —$CH_3$, —$CH_2CH_3$, or —$C_6H_5$.

6. The polymer of claim 5 wherein $Ar_1'$ is selected from the group consisting

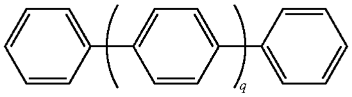,
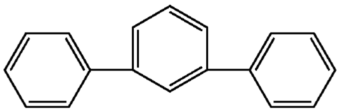,
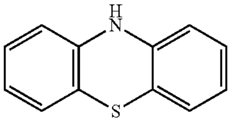,
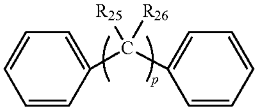,
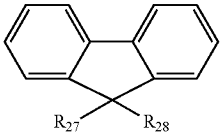,
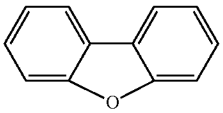,
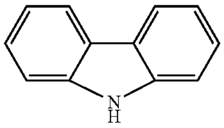

and mixtures thereof, wherein $R_{25}$, $R_{26}$, $R_{27}$, and $R_{28}$ are each independently —H or —$CH_3$;

wherein p is 1 or 2; and wherein q is 0 or 1.

7. The polymer of claim 5 wherein $Ar_2'$ is selected from the group consisting of:

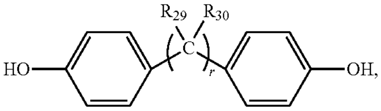
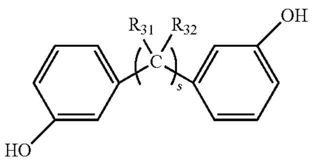,
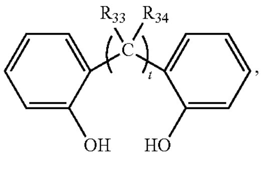,

-continued

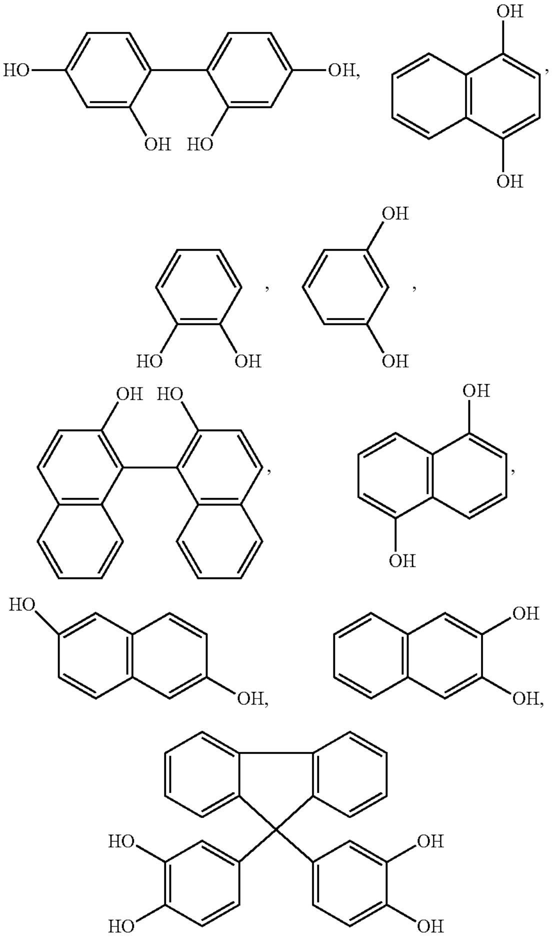

and mixtures thereof;

wherein $R_{29}$, $R_{30}$, $R_{31}$, $R_{32}$, $R_{33}$, and $R_{34}$ are each independently $-CH_3$ or $-CF_3$; and wherein r, s, and t are independent 0 or 1.

8. The polymer of claim 5 wherein $X_1'$ is a mixture of

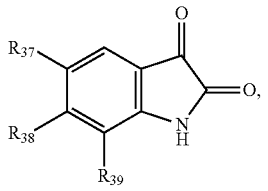

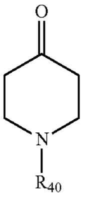

and

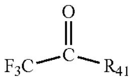

wherein $R_{37}$, $R_{38}$, $R_{39}$, and $R_{40}$ are each independently $-H$, $-CH_3$, $-CH_2CH_3$, $-CH(CH_3)_2$, $-C(CH_3)_3$, $-CH_2-C_6H_5$, or $-CH_2-CH(CH_3)_2$; and wherein $R_{41}$ is $-CH_3$, $-CH_2CH_3$, or $-C_6H_5$.

9. A membrane made from the polymer of claim 1.

10. A process for separating at least one gas from a mixture of gases, the process comprising:

a) providing a membrane made from the polymer of claim 1;

(b) contacting the mixture of gases to one side of the membrane to cause said at least one gas to permeate the membrane; and (c) removing from the opposite side of the membrane a permeate gas composition comprising a portion of said at least one gas which permeated the membrane.

11. The process of claim 10 wherein the mixture of gases comprises hydrogen sulfide and carbon dioxide in natural gas.

12. The process of claim 10 wherein the mixture of gases comprises hydrogen sulfide and carbon dioxide in biogas.

13. The process of claim 10 wherein the mixture of gases comprises hydrogen in a mixture of nitrogen, methane.

14. The process of claim 10 wherein the mixture of gases comprises carbon dioxide in flue gas.

* * * * *